US012476415B2

(12) United States Patent
Fischell et al.

(10) Patent No.: US 12,476,415 B2
(45) Date of Patent: Nov. 18, 2025

(54) DRY-MATE CONNECTOR SYSTEM FOR SUBMERSIBLE ELECTRONICS

(71) Applicant: ACBOTICS RESEARCH, LLC, East Falmouth, MA (US)

(72) Inventors: Erin Fischell, East Falmouth, MA (US); Sam Fladung, East Falmouth, MA (US); David R. Fischell, Fairhaven, NJ (US)

(73) Assignee: Acbotics Research, LLC, East Falmouth, MA (US)

( * ) Notice: Subject to any disclaimer, the term of this patent is extended or adjusted under 35 U.S.C. 154(b) by 490 days.

(21) Appl. No.: 18/160,395

(22) Filed: Jan. 27, 2023

(65) Prior Publication Data

US 2023/0261413 A1 Aug. 17, 2023

Related U.S. Application Data

(60) Provisional application No. 63/310,927, filed on Feb. 16, 2022.

(51) Int. Cl.

| | |
|---|---|
| ***H01R 13/523*** | (2006.01) |
| ***H01R 13/443*** | (2006.01) |
| ***H01R 13/52*** | (2006.01) |
| ***H01R 24/40*** | (2011.01) |
| ***H01R 24/64*** | (2011.01) |

(52) U.S. Cl.
CPC ......... *H01R 13/523* (2013.01); *H01R 13/443* (2013.01); *H01R 13/5202* (2013.01); *H01R 24/40* (2013.01); *H01R 24/64* (2013.01)

(58) Field of Classification Search
None
See application file for complete search history.

(56) References Cited

U.S. PATENT DOCUMENTS

2008/0003868 A1* 1/2008 Cairns ................ H01R 13/5219
439/552

* cited by examiner

*Primary Examiner* — Tho D Ta
(74) *Attorney, Agent, or Firm* — Rosenberg, Klein & Lee

(57) ABSTRACT

A Dry-Mate Connector System (DMCS) is capable of a direct and convenient connection/disconnection of standardized Commercial Off-The Shelf (COTS)-compatible data communication cables and connectors with submersible electronic equipment for transmission of data/signals/power therebetween, and is suitable for indefinite submersion, as well as adaptable to full ocean depth. DMCS is equipped with sealing elements, a keying/alignment mechanism for proper alignment of COTS connectors for mating the portions, a locking mechanism to ensure the portions remain locked and pressure sealed, and a dummy plug for sealing the connector when not in use. Functional dummy plugs are contemplated to broaden the functionality.

32 Claims, 19 Drawing Sheets

DRY-MATE CONNECTOR SYSTEM FOR SUBMERSIBLE ELECTRONICS

REFERENCE TO RELATED PATENT APPLICATION(S)

This Utility patent application is based on the provisional Patent Application No. 63/310,927 filed on 16 Feb. 2022.

FIELD OF THE INVENTION

The present invention is directed to connectors, and particularly, to connectors for interconnection of submersible electronics to external equipment.

More in particular, the present invention addresses a connector system capable of a direct connection of standardized Commercial Off-The Shelf (COTS)-compatible data communication cables and connectors with submersible electronic equipment/systems and suitable for indefinite submersion, as well as adaptable to full ocean depth.

In overall concept, the present invention contemplates a Dry-Mate Connector System (DMCS) which utilizes mechanical design components that enclose standard COTS connector/cable hardware, to enable a convenient connection/disconnection between sealed pressure vessels containing electronic equipment and external devices for transmission of signals/power therebetween, and which would be suitable for submerged and surface applications including, but not limited to the data/signals communication and power transfer between equipment at atmospheric pressure and electronic equipment in a submersible pressure vessel, different sets of submerged electronic equipment, sets of equipment at different ambient pressures including one set at atmospheric pressure and another at vacuum, external data storage for electronic equipment in a pressurized vessel, data offload from a submersible system, simultaneous power and data transfer for submersible systems, simultaneous power and data transfer between systems at different pressures, for charging of batteries in a pressure vessel, tethering underwater systems to other underwater or surface equipment, real-time underwater system monitoring, attached antennas for sealed underwater housings, plug-and-play sensor, power and communication connection to a submersible pressure vessel, computer networking of underwater systems, underwater camera connection and integration, and other related system.

BACKGROUND OF THE INVENTION

Contemporary electronic devices which require high-speed data communication in air utilize standardized Commercial-Off-The-Shelf (COTS) connectors and cable hardware such as USB-C, micro-USB, mini-USB, USB-A, USB-B, RJ-45 and SMA that meet a variety of data communication standards such as USB 2, USB 3, USB4, USB-C, Thunderbolt, CAT-5, CAT-6, CAT-8 ethernet, Power over ethernet (PoE) and radio frequency (RF) communications.

Conventional underwater connectors/connector systems (which are suitable for the immersion depth beyond 1 meter for a sufficient duration of operation) are typically used to transfer power and/or signals between the submerged communication devices and/or the surface equipment. Such underwater connectors are manufactured by several companies, for example, Subconn and Impulse. The underwater connectors require formation of customized pin-by-pin cable harness for both internal and shore cables. The customization of the equipment is typically associated with engineering and usage challenges encountered.

The conventional underwater connectors/connector systems are limited by their incompatibility with current high-speed data communication protocols and data transfer standards. Most high-speed data protocols use a physical layer with defined transmission line parameters. Deviations from the specified transmission line characteristics or characteristic impedance may lead to signal attenuation, reflection and corruption resulting in signal errors, reduced bandwidth or complete communication failure, depending on the severity of these deviations. An additional shortcoming of the conventional underwater connectors/connector system is that attempting to connect USB, Lightning, ethernet, or other standardized cables to the individual pins of the conventional underwater connectors may be difficult, as well as liable to failure and user errors.

Waterproof IP68 ethernet, USB-A and USB-B connectors and cables are manufactured by several companies, including Bulgin, Ltd. These waterproof connectors and cables are capable of operating on the submersion depth of 10 meters for 2 weeks. They, however, are not suitable for sensor and marine robotics applications requiring either a longer duration of operability or a deeper submersion.

In addition, a Gigabit ethernet wet-mate underwater connector is manufactured by Subconn, which, however, does not include a COTS standard RJ-45 jack for convenient connection to a standard ethernet cable from the submersible side of the bulk-head connector.

Disadvantageously, the conventional water-resistant USB-connectors are bulky and not rated for long term submersion or depth. Transmission joints (glands) simply pass data across but do not allow a disconnect/swapping of devices and therefore fail to solve the fundamental need for user-friendly underwater high-speed data and/or power transmission using Commercial-Off-The-Shelf (COTS) standard connections.

Underwater connecting systems for various applications constitute a long-lasting need in data communication. For example, underwater camera systems require high-speed data communication ability to function for long periods and more than 1 m depth of submersion. Additionally, networked computing and sensing is increasingly important to underwater robotics with an associated need for high-speed transfer of information. This includes the requirement for large quantities of data collected underwater to be easily offloaded on the surface equipment from a computer in a pressure vessel without unsealing the vessel. Furthermore, numerous devices utilize Power over ethernet and USB-C/Thunderbolt connections requiring high power through-put without compromising data transfer. These are also needed for connecting to and/or charging underwater systems. Further, flexible plug-and-play architectures for connecting swappable compatible devices are not currently available for underwater systems.

It would be highly desirable to provide a connector system for submersible electronic equipment/systems that would be capable of a direct connection to standardized Commercial Off-The Shelf (COTS)-compatible data communication cables and connectors suitable for indefinite submersion and adaptable to full ocean depth.

SUMMARY OF THE INVENTION

It is therefore an object of the present invention to provide a connector system capable of a direct connection of standardized Commercial Off-The Shelf (COTS)-compatible data communication cables and connectors with submersible electronic equipment/systems.

It is another object of the present invention to provide a connector system for coupling with submersible electronic equipment and suitable for indefinite submersion, as well as adaptable to full ocean depth.

It is a further object of the present invention to provide a Dry-Mate Connector System (DMCS) which utilizes mechanical design components that enclose standard COTS connector/cable hardware to enable a convenient removable connection between a sealed pressure vessel and external devices.

It is also an object of the present invention to provide the DMCS which would be compatible with various COTS connector and cable standards including:

- USB 3, USB-C, Thunderbolt, USB-A, USB-B, Micro-USB, Mini-USB,
- Apple standards such as lightning,
- Connectors and cables for CAT-5, CAT-6 and CAT-8 ethernet and standard telephone, including 8P8C, RJ11, RJ14, RJ21, RJ25 and RJ-45,
- Coaxial cable and connector standards including RG, SMB, SMA, U.FL, MMCX, MCX, N, BNC and TNC, and
- Memory card adapters including compact flash, XQD, SD, CFast, MMC and micro-SD slots and adapters.

It is an additional object of the present invention to provide a connector system which would be suitable for submerged and surface applications including, but not limited to, data offload, power transfer/charging, and tethering between electronic equipment in a sealed housing and external equipment.

It is a further object of the present invention to provide a connector system suitable for underwater and surface applications including:

- communication and power transfer between:
  - Equipment at atmospheric pressure and electronic equipment in a submersible pressure vessel,
  - Two different sets of submerged electronic equipment,
  - Sets of equipment at different ambient pressures including one set at atmospheric pressure and another at vacuum.
- external data storage for electronic equipment in a pressurized vessel,
- data offload from a submersible system,
- simultaneous power and data transfer for submersible systems,
- simultaneous power and data transfer between systems at different pressures.
- charging of batteries in a pressure vessel,
- tethering underwater systems to other underwater or surface equipment,
- real-time underwater system monitoring,
- attached antennas for sealed underwater housings,
- plug-and-play sensor, power and communication connection to a submersible pressure vessel,
- computer networking of underwater systems, and
- underwater camera connection and integration.

Another object of the present DMCS is to include a keying/alignment mechanism such as an insert or inserts, to ensure proper alignment of COTS connectors as the components are mated.

Still another object of the present invention DMCS is to include a locking mechanism to ensure that, once mated, the components of the connector system cannot separate and remain locked, and pressure sealed.

A further object of the present DMCS is to include a dummy plug that allows sealing of a DMCS connector when it is not being used to connect to external equipment.

Furthermore, it is an object of the present invention to provide the underwater connector system utilizing functional dummy plugs which may include one or more of the following elements: a data storage device, an antenna, a camera, a visual display, an acoustic transducer, an environmental sensor, a vacuum port, an actuator, storage media, and/or a hydrophone or a hydrophone array.

Still another object of the subject invention is a method of sealing a DCMS bulkhead connector to a bulkhead or surface, sealing in-line connectors to bulkhead connectors and sealing dummy/function plugs to a bulkhead connector.

A further object of the present invention is to provide the dry mate connector system having the applicability for underwater vessel to underwater vessel and/or underwater vessel to surface vessel cables.

Yet another object of the present invention is to provide the dry mate connector system capable of supporting the simultaneous transmission of power and high-speed data communication via existing standards/protocols, such as Power over ethernet (POE), USB-C or Thunderbolt.

The underlining principle of the present invention addresses a so-called "dry mate" connection system (DMCS) solution which obviates the limitations of conventional underwater connectors and access ports for high-speed data communication and transfer. Dry-mate terminology, in the context of the present disclosure, encompasses the cables or connectors which may be connected/disconnected in the air, i.e., when dry, and once mated, the DMCS would be suitable for operation sustained for months or years-long duration and at the depth submersion greater than 10 in.

The subject DMCS preferably includes embodiments that utilize a novel mechanical design with bulkhead and bore O-ring seals, potting compounds, alignment systems, and locking mechanisms. In one of preferred embodiments, the DMCS comprises (a) a bulkhead connector for being sealed externally to (wet side of) a pressure vessel/housing with an internally mounted COTS connector, or cable, that connects internally to the inside (dry side) of the housing, and (b) a compatible in-line connector with internally mounted cable with a COTS connector at its end. The in-line connector has an O-ring seal designed to mate and seal with the wet side of the bulkhead connector such that the mate (coupling) creates a simultaneous connection between the COTS connector at the end of the cable in the in-line connector and the COTS connector at the wet side of the bulkhead connector. This connection provides a COTS compatible underwater high-speed feed-thru to the equipment inside (dry side) of the pressure vessel/housing. The terms vessel, pressure vessel and housing may be used herein interchangeably to refer to an equipment enclosure that is designed to be pressure sealed allowing use with vacuum or submersion in a liquid.

It is envisioned that some embodiments of the subject DMCS would include components to align the COTS connector in the in-line connector with its mate in the bulkhead connector as the in-line connector mates with the bulkhead connector.

The embodiments of the DMCS may also include:

- a "dummy plug" designed to seal to the DMCS bulkhead connector, and
- a locking mechanism to prevent inadvertent disconnection between the in-line connector and the bulkhead connector once mated.

The subject DMCS bulkhead connector permits the following benefits:

- over 20 in submersion for over 1 month submersion COTS-compatible dry-mate connectors and cables for all embodiments including embodiments for indefinite submersion and full ocean depth,
- simplicity of connection and disconnection,
- the ability to change out electronic devices connected to the system due to COTS-standard connections (i.e. plug-and-play),
- simultaneous high data rates and power transfer capabilities,
- the elimination of custom pin by pin cable systems as COTS standard cables may be connected directly between sealed housings capable of long immersion and full ocean depth use,
- the ability to connect COTS standard cables to the wet side of a DMCS bulkhead connector for applications such as data offload, bench communications, or tank testing to improve usability and testability of underwater sensing systems and underwater vehicles, and
- the use of a single diameter of hole in a pressure vessel/housing bulkhead for a wide range of different COTS connector DCMS embodiments.

In one of preferred embodiments, the subject DMCS bulkhead connector system uses a Female Bulkhead USB-C Connector (FBUC) configuration. The FBUC configuration utilizes an O-ring face seal to the bulkhead of a sealed pressure vessel/housing, a USB-C connector, and a wet side bore with an internal sealing surface.

A plastic insert with internally stabilized and positioned male-to-female USB-C COTS adapter is contemplated in the subject FBUC configuration to facilitate the alignment male USB-C connector in the male in-line connector with the female USB-C connector in the female bulkhead connector during mating of male in-line connector (MILC) with the FBUC.

An alternative preferred embodiment of the subject connector system may utilize a male dummy plug with an external O-ring that seals the dummy plug into the wet side bore of the FBUC configuration when the FBUC configuration is not in use with the MILC The dummy plug may be removed on the surface allowing the COTS connections for charging and data access to the sealed housing.

The DMCS provides the underwater maintenance of the integrity (keeping them dry) of COTS connectors and cables while eliminating the splicing requirement. This design provides the connection of the underwater devices to each other and to the surface equipment similar to the connection of the COTS compatible devices in air, i.e., plug-and-play.

Another preferred embodiment of the subject DMCS supports the connection of data storage (e.g. flash memory cards, SSDs and disk drives), providing additional storage space for underwater vehicles and sensing systems and facilitating data offload. This preferred embodiment of the subject DMCS is based on a dummy plug/cap approach that is adapted to include a storage device insertable into a card slot in a bulkhead connector, for example, connectors or slots for a USB thumb drive, microSD card, SD card, compact flash card or similar small storage device, are contemplated in this embodiment. Upon removal of the dummy plug/cap, access to the storage device would allow the storage device to be removed, or swapped, as needed by a user.

An alternative preferred embodiment of the subject DMCS may have the dummy plug seal disposed over a storage device inserted into a slot or connector in the bulkhead connector wet side. It is also envisioned that guides or marker lines would facilitate alignment of the dummy plug/cap with the bulkhead connector to facilitate insertion of a storage device into the compatible slot in the bulkhead connector.

Other embodiments of the dummy plug (also referred to herein as a function plug) where it has functioning equipment may include a data storage device, an antenna, a camera, a visual display, an acoustic transducer, an environmental sensor, a vacuum port, an actuator, and/or a hydrophone or hydrophone array. Function plugs differ from in-line connectors in that they do not include a COTS compatible cable for connecting a bulkhead connector to external equipment.

These and other objects and advantages of this invention will become more apparent from the detailed description of the invention and the associated drawings provided herein.

BRIEF DESCRIPTION OF THE DRAWINGS

FIG. 13A is a longitudinal cross-section of the DMCS USB-C male in-line connector of FIG. 3A with the DMCS USB-C female bulkhead connector of FIG. 12A where the connectors are misaligned and cannot mate, FIG. 13B is a longitudinal cross-section of the DMCS USB-C male in-line connector of FIG. 3A with the DMCS USB-C female bulkhead connector of FIG. 12A where the connectors are aligned and can mate, and FIG. 13C is a longitudinal cross-section of the DMCS USB-C male in-line connector of FIG. 3A with the DMCS USB-C female bulkhead connector of FIG. 12A where the USB-C connectors are fully mated;

FIG. 14A shows a longitudinal cross-section of the misaligned insertion of a DMCS male in-line connector with an asymmetric COTS connector into a complementary DMCS female bulkhead connector, FIG. 14B shows a longitudinal cross-section of the aligned insertion of a DMCS male in-line connector with an asymmetric COTS connector into a complementary DMCS female bulkhead connector, and FIG. 14C is a cross-sectional view of the fully mated DMCS connectors of FIG. 14B;

DETAILED DESCRIPTION OF THE PREFERRED EMBODIMENT(S)

Figure 1:
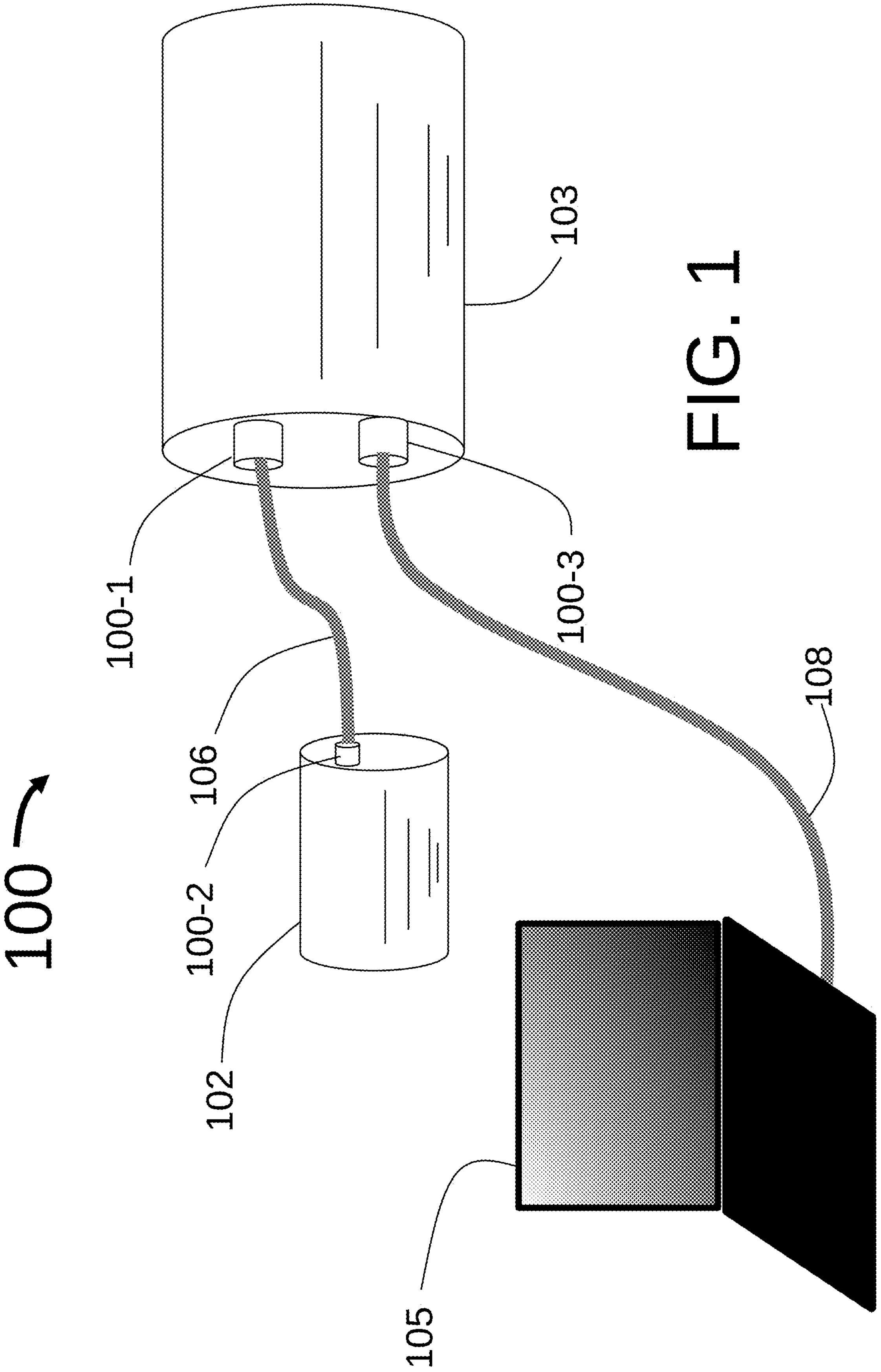
FIG. 1 is a schematic representation of exemplary applications of the subject dry mate connector system (DMCS) for data and/or power transfer between pressure vessels as well as between a pressure vessel and a computer.

FIG. 1 is a schematic representation of two exemplary applications of the subject dry-mate connector system (DMCS) 100 for data and/or power transfer between a primary pressure vessel 103, also referred to herein intermittently as a housing, and one (or several) secondary pressure vessel(s) 102, also referred to herein intermittently as a housing, as well as between the primary pressure vessel 103 and one (or several) secondary computer(s) 105. The DMCS 100 in FIG. 1 is represented, as an example, by a plurality of DMCS modules including DMCS 100-1, 100-2, 100-3. Any other number of the DMCS modules is also contemplated in the context of the present system and method.

Each of the primary pressure vessel 103 and the secondary pressure vessel 102 may be used as an underwater system and/or as an air system, depending on the particular application of the present system. The DMCS is attached to a wall of the pressure vessel at a "wet side" of the pressure vessel, i.e., externally to a wall of the pressure vessel which may be submerged underwater. The DMCS provides a sealed connection between the wet side and a "dry side", i.e., the interior of the pressure vessel, as will be detailed further herein.

Embodiments of the primary pressure vessel 103 may encompass electrical equipment that typically include power and computing electronics. As an example, but not to limit the scope of the present invention to the particular implementation presented in FIG. 1, data and/or power transfer between the components depicted in FIG. 1 may be achieved via the DMCS 100-1 disposed at the primary pressure vessel 103 through the cable 106 to the DMCS 100-2 sealed to the secondary pressure vessel 102.

The secondary pressure vessel(s) 102 is (are) frequently used in underwater systems for environmental, optical, and acoustic sensors. As an example, the secondary pressure vessel may include an underwater camera that requires a high-speed video link along with power over the cable 106. As an example of the communication means, various versions of ethernet or USB-C can be used in this system to provide both power and data communication.

In another embodiment of the present DMCS 100, the primary pressure vessel 103 may be accommodated with the DMCS 100-3 for being connected by the cable 108 to dry/atmospheric pressure electronic equipment, such as, for example, a laptop computer 105 (or several computers). A standard COTS (Commercial-Off-The-Shelf) connector can be provided on the computer 105 for connection with the cable 108. This communication provides a significant benefit as the DMCS 100 makes it possible to connect a standard dry-environment power supply, computer or a sensor to the still-sealed pressure housing 103 without having to disassemble or open up the pressure housing.

The cable 108 can also be used when the primary pressure vessel 103 is underwater with the cable acting as a tether from surface equipment to underwater equipment. When the primary pressure vessel 103 is on the surface (out of water), it is also envisioned that either of the DCMS 100-1 or 100-2 can be removed and a COTS cable can be directly connected to the DCMS 100 bulkhead connector detailed further herein.

The subject DMCS 100 provides plug-and-play functionality for a wide range of underwater applications. The DMCS is designed to provide both pressure vessel to pressure vessel connection and pressure vessel to atmospheric pressure equipment connection using different COTS cable/connector configurations.

The DMCS 100 is also capable of providing simultaneous data and power transfer which are particularly beneficial for topside data retrieval, programming and charging, as well as for bench testing/debugging of underwater systems.

The DMCS 100 embodiments addressed in the present disclosure, demonstrate possible uses for an underwater connector system to provide waterproof COTS connectivity for extended time periods and full ocean depth.

Figure 2:
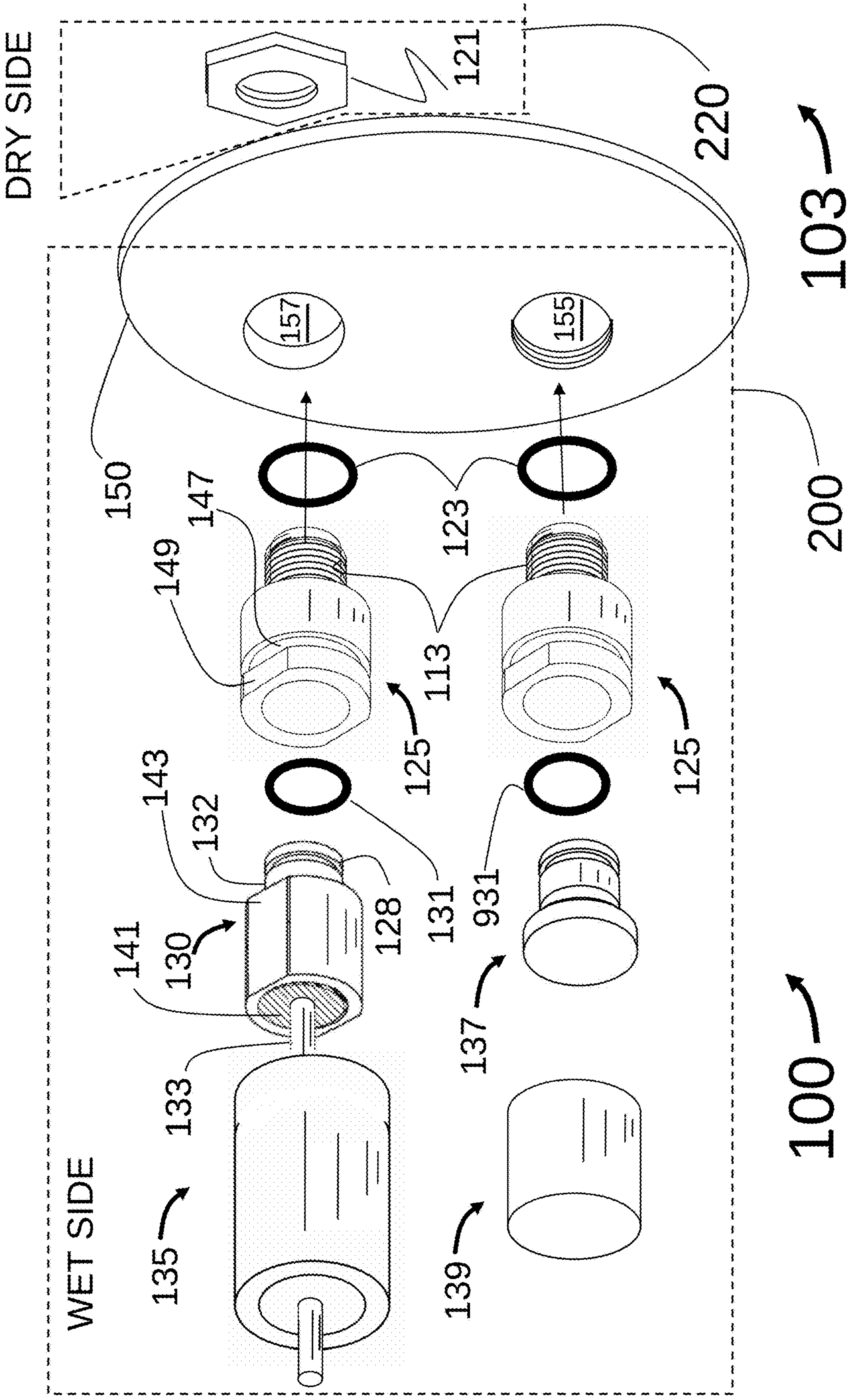
FIG. 2 is a representation of an embodiment of the subject DMCS configured with a female bulkhead connector, an in-line connector, a cable, a locking collar and a dummy plug.

FIG. 2 is a schematic view of one of preferred embodiments of the DMCS 100, which includes a portion of the subject connector located at the "wet side" 200, i.e., externally to the wall of the pressure vessel exposed to water, and thus will be intermittently referred to herein as a "wet side portion" or an "external portion" of the DMCS. Another portion of the DMCS (which cooperates with the "wet side portion" of the DMCS) is located internally at the "dry side" 220 of the pressure vessel, and thus will be referred to herein intermittently as a "dry side portion" or an "external portion" of the subject DMCS. The wet side portion may be configured with a female bulkhead connector 125, an in-line connector 130, cable 133, and a dummy plug 137. Also included in the wet side are O-rings 123, 931 and 128, and locking collars 135 and 139. The male in-line connector 130 and dummy plug 137 are both designed to be mated to the female bulkhead connector 125.

While some of the drawings described herein show a DMCS with COTS connectors and cables, such as USB-C, RJ-45 or coaxial connectors, other drawings show the DMCS without the connectors, where it is to be assumed that the embodiments addressed herein are applicable to any COTS connector or cable.

COTS connection standards applicable to the embodiments of the subject DMCS 100 include:

- USB Standards, including USB 3, USB-C, USB-A, USB-B, Micro-USB, Mini-USB,
- Apple standards such as lightning,
- connectors for ethernet and voice, including 8P8C, RJ11, RJ14, RJ21, RJ25 and RJ-45,
- coaxial standards including RG, SMB, SMA, U.FL, MMCX, MCX, N, BNC and TNC, and
- memory card adapters including compact flash, XQD, SD, CFast, MMC and micro-SD slots and adapters.

Figures 3A, 3B:
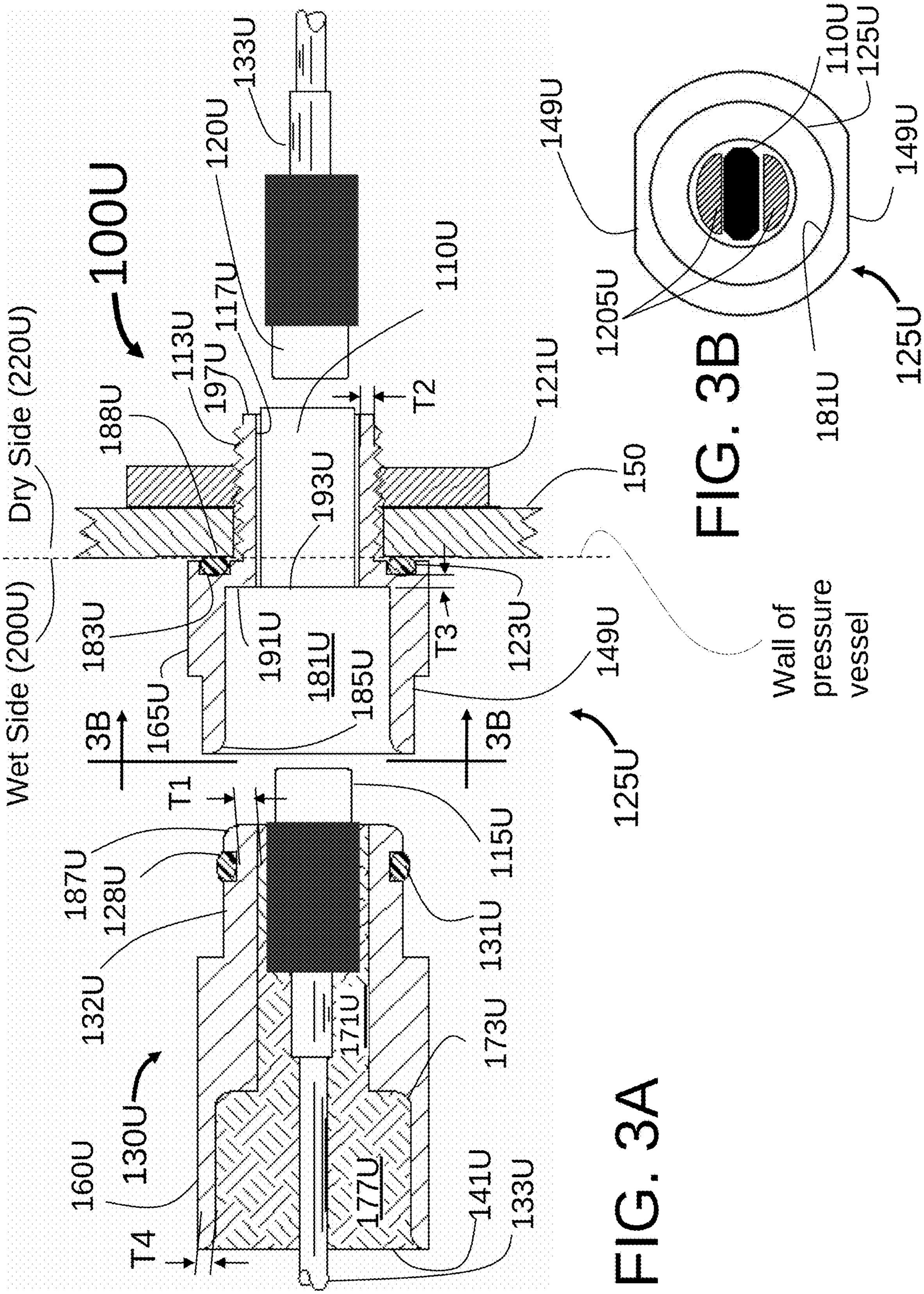
FIG. 3A depicts a longitudinal cross-section of an USB-C embodiment of the subject DMCS configured with a female bulkhead connector and a male in-line connector.
FIG. 3B is a top view of the DMCS USB-C embodiment depicted in FIG. 3A.
Figure 3C:
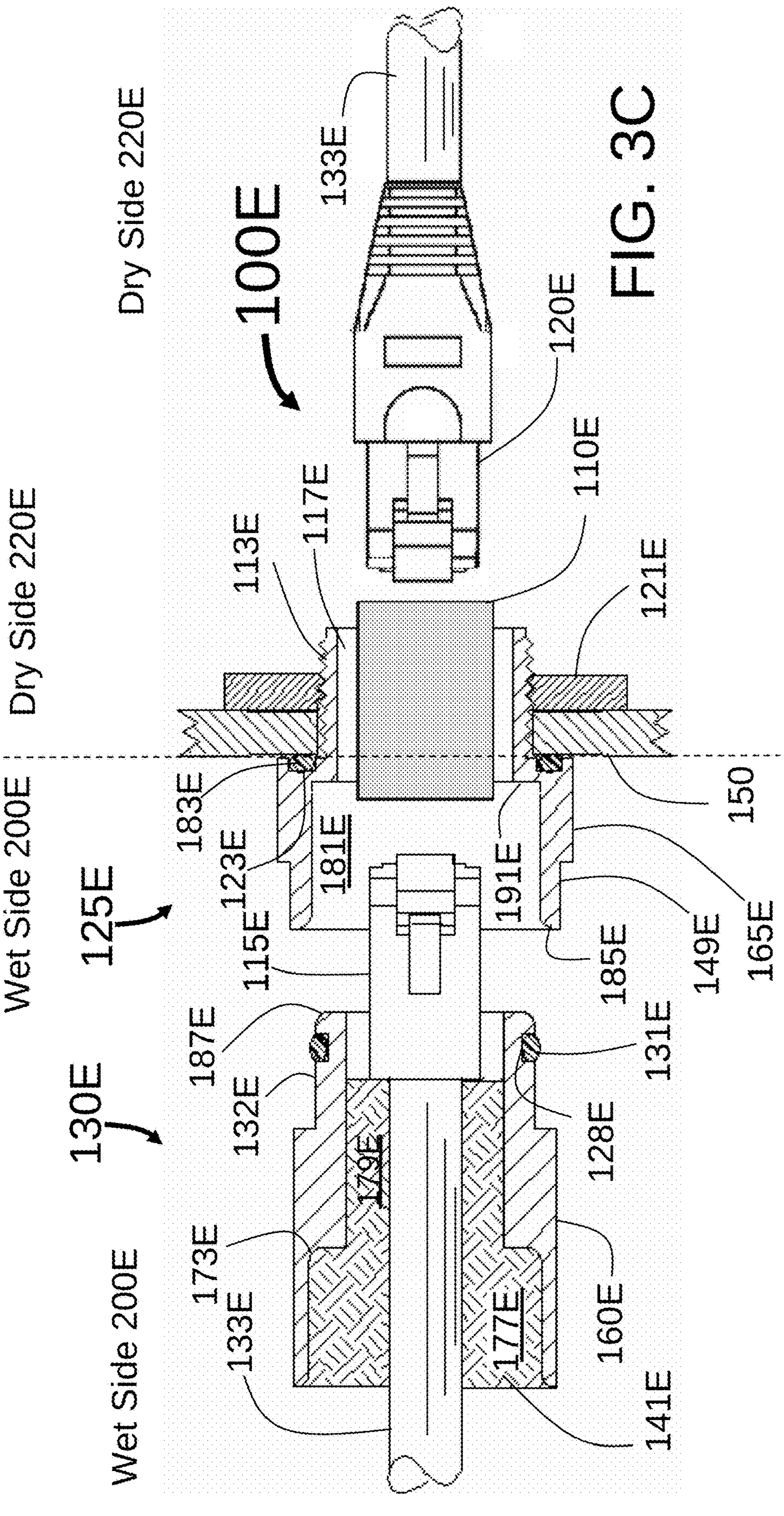
FIG. 3C shows a longitudinal cross-section of an RJ-45 ethernet embodiment of the subject DMCS configured with a female bulkhead connector and a male in-line connector.
Figure 3D:
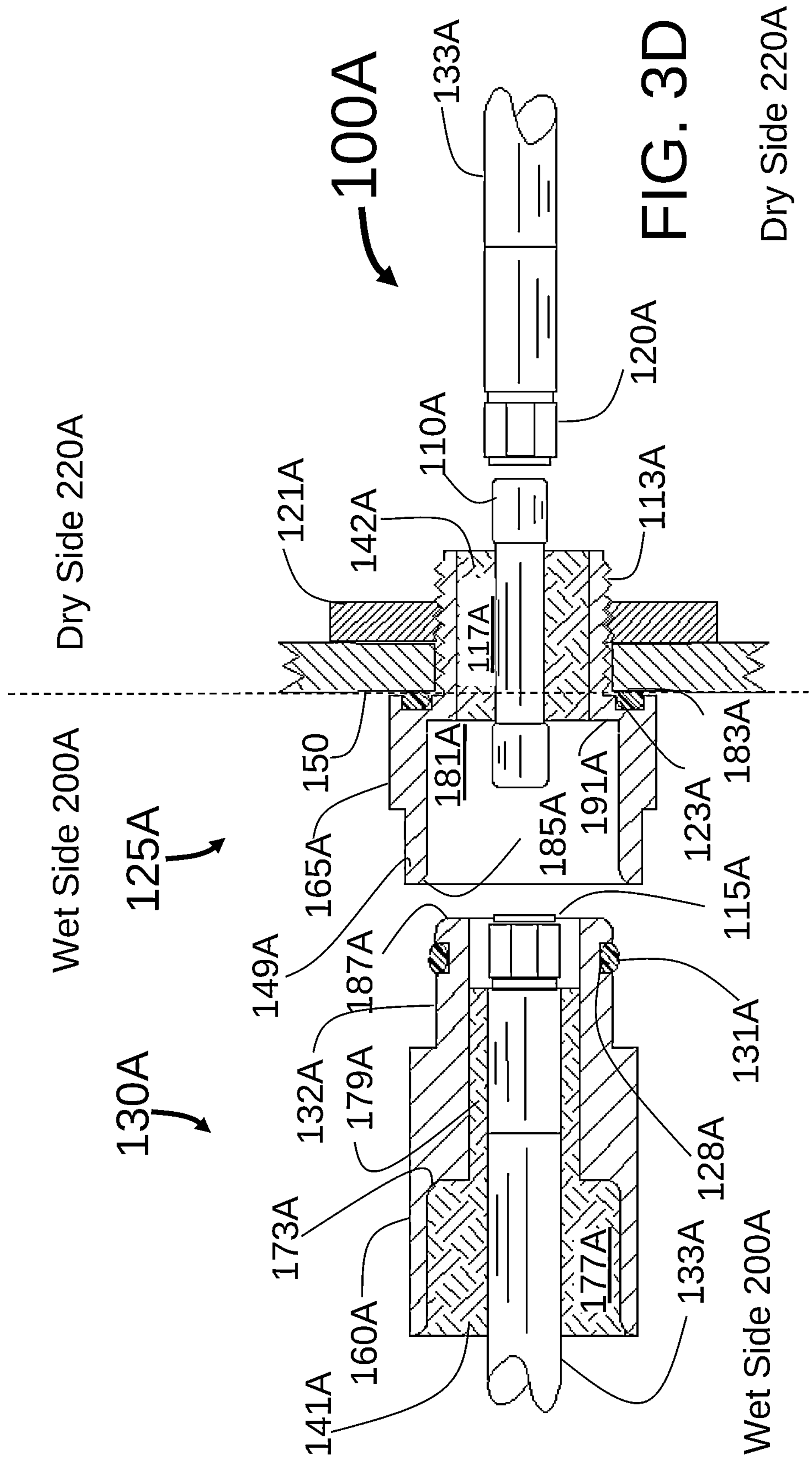
FIG. 3D shows a longitudinal cross-section of a coaxial cable/RF embodiment of the subject DMCS configured with a female bulkhead connector and a male in-line connector.

A bulkhead 150 is positioned in contact with the wall of the pressure vessel (as best shown in FIGS. 3A, 3C, and 3D) to separate the dry side 220 of the pressure vessel 103 from its wet side 200. The threaded portion/shafts 113 are inserted through the holes 157 and 155 and sealed to the surface of the bulkhead 150. Such arrangement permits electrical cables extending at the wet side 200 of the pressure vessel 103 to connect through to electronics disposed at the dry side 220 of the pressure vessel 103. As an example, it is envisioned that the holes 157 and 155 may be a through-hole 157 or a drilled and tapped hole 155 to provide retention of the bulkhead connector 125.

The O-ring 123 provides a seal between the female bulkhead connector 125 and the bulkhead 150. For the through-hole 157, a nut 121 (which is disposed at the dry side 220) is threaded onto the shaft 113 on the dry side of the bulkhead 150 to retain the female bulkhead connector 125 and compress the face o-ring 123 against the bulkhead 150. For the threaded hole 155, the female bulkhead connector 125 is screwed directly into the hole 155 and tightened to compress the face O-ring 123 against the bulkhead 150.

The female bulkhead connector 125 includes a flat feature 149 and a groove 147 to allow pins (not shown) to guide alignment of the locking collar 135 as it is advanced to its locked configuration preventing separation of the mated in-line connector 130 and female bulkhead connector 125.

The in-line connector 130 mates to the bulkhead connector 125 via a bore seal O-ring 128 that sits in an O-ring groove 131 on the reduced diameter section/plug 132 of the in-line connector 130. In other embodiments, two O-rings may be used. The cable 133 is potted into the in-line connector 130 using epoxy, urethane, or other material to provide a complete sealed system. The potting compound 141 fills the in-line connector 130 around the cable 133 to completely seal the cable 133 and the DCMS 100 from water once the in-line connector 130 is mated with the female bulkhead connector 125.

Once the bore O-ring 128 seal is seated by pushing the in-line connector 130 into the female bulkhead connector 125, a locking collar 135 is advanced longitudinally over the male in-line connector 130 and a portion of the female bulkhead connector 125 is rotated to prevent longitudinal motion of the male in-line connector 130 with respect to the female bulkhead connector 125 to ensure that the bore seal remains sealed.

The in-line connector 130 includes a flat surface 143 on each side of the in-line connector 130. The flat surfaces 143 align with the flat surfaces/flats 149 formed on the bulkhead connector 125. In one of the preferred embodiments of the DMCS, as depicted in FIGS. 8A-8E, the locking collar 135 has pins 813 that pass over the flat portions 143 of the in-line connector 130 and flat portions 149 of the female bulkhead connector 125. The pins 813 twist into the groove 147 in the female bulkhead connector 125.

For applications where a cable is not in use, the "dummy plug" 137 seals the female bulkhead connector 125. The dummy plug 137 can be removed when not in water to allow a COTS high-speed data and/or charging cable to connect to surface equipment, such as, for example, the laptop computer 105 of FIG. 1.

The bore O-ring design for the dummy plug 137 is similar to the configuration shown for the in-line connector 130, with the O-ring 928 providing a bore seal when the dummy plug 137 is inserted into the bore 181 of the female bulkhead connector 125. As with the in-line connector 130, alternative embodiments of the dummy plug 137 might include two O-rings instead of a single O-ring 928.

The locking collar 139 is contemplated for use with the dummy plug 137. The locking collar is advanced on the dummy plug 137 and rotated to lock the longitudinal motion of the dummy plug 137 with respect to the female bulkhead connector 125 to prevent the inadvertent removal of the dummy plug 137 and to ensure it does not become unseated during underwater use including depth cycling. Additional details of the dummy plug 137 are shown in FIG. 9A.

The in-line connector 130, dummy plug 137, female bulkhead connector 125, and locking collars 135 and 139 may be manufactured out of metal, but may also be manufactured out of plastic. Key material considerations include strength and rigidity to ensure the O-rings remain sealed. Aluminum is suitable for shallow-water applications, while titanium or stainless steel may be used for deeper applications. Either a non-corroding metal (e.g., stainless steel) or a surface treatment (e.g. powder coating, anodization) may be used to reduce corrosion potential. The material of the connector preferably are matched to the material of the bulkhead to reduce galvanic potential.

FIG. 3A shows a longitudinal cross-section of an embodiment of a DMCS 100U Female Bulkhead USB-C Connector (FBUC) 125U sealed against the bulkhead 150 of a pressure vessel/underwater housing. Also shown is an embodiment of a USB-C male in-line connector (MILC) 130U aligned for mating with the FBUC 125U. A COTS USB-C cable 133U is potted with a potting material 141U such as epoxy into the bore 177U of the MILC 130U. The male electrical connector 115U of the cable 133U is offset such that it protrudes distally beyond the filleted or chamfered edge 187U of the MILC 130U.

The shell of the MILC 160U that is typically metal, has a flat portion 143U, a reduced diameter portion/plug 132U, O-ring groove 131U with O-ring 128U, and tapered leading edge 187U.

Further herein, the terminology "distal" will refer to the direction towards the dry side away from the wet side, the terminology "proximal" will refer to the direction towards the wet side away from the dry side. The terminology "taper" may refer to a filet or a chamfer.

The bore 177U serves as a "potting cup" to hold the potting material 141U around the COTS electrical cable 133U with sufficient diameter to ensure that the potting material 141U fully adheres to the cable 133U. For example, in some embodiments, a sufficient diameter is contemplated to be a minimum of 1.5× the cable diameter up to maximum diameter allowed within other design constraints.

The MILC potting cup 177U includes a taper 173U for improved adhesion of the potting material 141U to the shell 160U. The potting cup 177U is included in the design of the in-line connector 130U to provide sufficient epoxy coverage and structural integrity of the pot. A vacuum may be used in the potting process to ensure no gas bubbles are present in the final product. The interior of the MILC 130U shell 160U also includes a reduced diameter bore 171U which is larger than the diameter of the electrical connector 115U.

The O-ring 128U in the O-ring groove 131U of the plug 132U is selected to ensure a reasonable radius difference between the inner bore 171U and the groove 131U. The O-ring groove 131U is positioned distally on the bore plug surface 132U to provide a "sweep" of any water between the MILC and FBUC prior to un-mating of the MILC 130U with the FBUC 125U.

In some embodiments, a space between the COTS cable 133U and the bore 171U would contain a keyed (or alignment) insert, which in some embodiments is designed to facilitate alignment of the MILC 130U with the FBUC 125U so that the male USB-C connector 115U is aligned to guide its insertion into the male-female USB-C adapter 110U.

The plug 132U with bore O-ring 128U is designed to mate and seal into the bore 181U of the FBUC 125U. In the preferred embodiment shown in FIG. 3A, the tapered features 187U and 185U improve centering of the MILC 130U as it is advanced into the FBUC 125U, and also ensures gradual compression of the O-ring 128U.

The shell 165U of the FBUC 125U Includes a flat surface 149U, a threaded section 113U with a bore 117U, a bore 181U with bottom 191U and an O-ring groove 183U into which the O-ring 123U is placed.

In an embodiment shown in FIG. 3A, a male-female USB-C adapter 110U is sealed into the bore 117U of the threaded section 133U of the FBUC 125U such that the outside edge 193U is flush or slightly recessed from the bore bottom 191U. This arrangement serves two purposes: (a) to ensure that, if the connector 115U of the in-line connector 130U is at an incorrect angle, there is a reduced risk of damage to the adapter 110U, and (b) to provide a tactile feedback to the user during the mating/coupling when the rotation is correct.

The housing bulkhead 150 separates the wet side 200U from the dry side 220U of the DCMS 100U where the face seal O-ring 123U in the O-ring groove 183U of the FBUC 125U seals against the wet side surface 188U of the bulkhead 150 when the nut 121U is tightened over the threaded section 113U. It is also contemplated that some embodiments of the present invention would include marker lines on the outside of the FBUC 125U and MILC 130U which may be placed to guide alignment during the mating process.

In some embodiments, the space between the COTS connector and stepped-down bore 117U may contain a keyed and/or plastic insert, epoxy, tape, or other fill. For USB-C in particular, the male-female adapter 110U may be potted into the bore 117U or sealed into an insert that itself is potted or sealed into the bore 117U to provide water resistance of the FBUC 125U IP68 when unmated.

The length of the threaded section 113U should provide that the distal (female) edge of the male-female adapter 110U is flush to, or slightly extending past, the distal edge 197U of the bulkhead connector shell 165U to ensure clearance for mating of the dry side USB-C cable 193U with male USB-C connector 120U. To connect to dry-side electronics, the male end 120U of a USB-C cable 193U is connected into male-female adapter 110U. For example, a dimension for the threaded shaft 113U for the USB-C connector would be M14 or M15 thread for metric measurements, or a 11⁄16-18 thread for a standard size. The cable 193U extends into the dry side 220U and would connect to equipment therein.

Mating of the MILC 130U with the FBUC 125U sealed to the bulkhead 150 is carried out through the following steps:

1. MILC 130U is distally advanced with the flat portion 143U aligned with the flat portion 149U of the FBUC 125U. This will align the male USB-C connector 115U with the male-female USB-C adapter 110U inside of the FBUC 125U. The MILC 130U is advanced until the small diameter section/plug 132U lies within the bore 181U of the FBUC 125U.

2. Subsequently, the MILC 130U is advanced until the USB-C connector 115U engages the female USB-C adapter 110U of the FBUC 125U.

3. Mating process is completed when the in-line connector 130U is advanced to fully insert its male USB-C connector 115U into the female adapter 110U of the FBUC 125U with the O-ring 128U of the MILC 130U forming a bore seal with the inside surface of the bore 181U of the FBUC 125U.

For those DMCS embodiments adapted for shallow water (up to 100 in depth), an example diameter of 171U is 0.5 inches, for a clearance of 0.05 inches to the diameter of the bore O-ring groove 131U.

For a bore seal there is no difference between the design for internal versus external pressure, so this part is the same for vacuum and water depth applications. An example of an O-ring 128U for this application may be an 015 O-ring referred to in the Parker O-ring handbook, with the bore 181U on the FBUC 125U of 0.687 inches and the in-line connector 130U having a plug diameter 132U of 0.685 inches, an O-ring groove 131U with a diameter of 0.587 inches and a width of 0.095 inches.

The bore 181U sealing surface should match the specification for a male bore seal referred to in the Parker O-ring handbook, with a finish with a roughness average (RA) of less than 12 micro-inches to ensure a good seal. To achieve this finish using a standard drill is not guaranteed, so a finishing process, such as, for example, the lathe cutting, milling, and/or reaming, may be recommended.

Examples of dimensions that result in minimum thicknesses to improve performance include the dimensions T1, T2, T3, and T4, shown in FIG. 3A. These thicknesses should be specified based on the material choice and desired pressure rating as follows:

- Dimensions T1 and T3 should be selected with at least a 20% margin of error for maximum desired pressure;
- Dimension T2 should be selected to ensure material strength in the thread. For example, for 100 in water depths in a stainless-steel part T1 and T3 can have a thickness of 0.05 inches, for a deeper application may require a thickness of 0.145 inches. T2 must be at least 0.05 inches in stainless steel and 0.125 inch in aluminum;
- T4 should be at least 0.05 inches in metal parts, but thicker for plastic to ensure no deflection and delamination of the potting material 141U with depth.

The use of the tapered portions 187U and 185U of the MILC and FBUC respectively will facilitate easier insertion of the MILC plug 132U into the bore 181U of the FBUC 125U. For example, a fillet radius of 1⁄16 inch or chamfer of 1⁄16 inch is sufficient on features 185U and 187U to ensure effective mating. A fillet radius or chamfer of ⅛" is recommended for feature 173U.

The inner diameter of the bulkhead connector 117U is dictated by the maximum diameter of the COTS USB-C male-female adapter; for the presented test case, a diameter of 0.55 inches would be preferred.

In the present specification, the term "external pressure" indicates that the pressure on the wet side 200U is higher than the pressure on the dry side 220U, as would be the case in most underwater applications. The term "internal pressure" indicates the pressure on the wet side 200U is lower than the pressure on the dry side 220U, as would be the case in a vacuum.

In embodiments of the FBUC 125U, the face O-ring 123U would, for example, be a number 115 found in the Parker O-ring Handbook. The inner diameter of the face O-ring groove 183U should match the average inner diameter of the O-ring, 0.674 inches to provide best performance versus external pressure in water. The outer diameter of the O-ring groove 183U should be the inner diameter plus the O-ring cross-section W, for the 115 O-ring W=0.103. The depth of the O-ring groove 183U should be the indicated as a gland depth in the parker O-ring handbook, or 0.082 inches for a 115 O-ring.

The face containing the O-ring groove 183U must be finished smooth to less than 12 microinches to ensure a good seal. The O-ring groove itself should have edges broken to an approximate radius of 0.005 inches. The ideal taper of the face O-ring groove 183U is 0 to 5 degrees. To achieve best practice in face O-ring groove cutting, a customized trepanning bit with appropriate curvature and width should be used. An example of the outside diameter of a DMCS 100U may be about 1 inch.

For an internal pressure scenario, the outer diameter of the face O-ring groove 183U should match the average outer diameter of the O-ring, 0.880 inches for the 115 O-ring used for the USC-C connector. The remaining specifications and roughness requirements are the same as for the external pressure case.

FIG. 3B, which is a top view of the FBUC 125U of FIG. 3A, shows the male-female USB-C adapter 110U, the insert(s) 1205U that support and position the male-female USB-C adapter 110U, the bore 181U and the flat surfaces 149U that provide clearance for a locking collar such as the locking collar 135 of FIG. 2.

FIG. 3C shows a cross-section of an embodiment of an RJ-45 ethernet DMCS 100E which is configured with a female bulkhead connector 125E and a male in-line connector 130E.

The female bulkhead connector 125E includes a shell 165E having a bore 181E, a distal surface 191E, flat surface 149E, and a threaded section 113E. The O-ring 123E is disposed in the O-ring groove 183E and is sealed against the bulkhead 150 of a pressure vessel when the nut 121E is tightened to compress the O-ring 123E against the wet side 200E surface of the bulkhead 150. A female-female RJ-45 adapter 110E is inserted in the bore 117E inside of the threaded section 113E of the female bulkhead connector 125E.

The in-line connector 130E includes a COTS ethernet cable 133E (e.g., CAT5, CAT6, or CAT8) with an RJ-45 connector 115E with the locking tab removed. The cable 133E is potted into the potting cup/bore 177E and reduced diameter bore 179E in the in-line connector 130E using potting material 141E.

A strain relief (not shown) may be added to further stabilize the ethernet cable 133E during and after the potting process. The male RJ-45 connector 115E is offset such that it protrudes beyond the tapered (i.e. filleted or chamfered) edge 187E of the in-line connector 130E. The proximal edge of a female-female RJ-45 adapter 110E is aligned such that it is flush with the distal end of the bulkhead connector bore 191E.

The bulkhead 150 separates the wet side 200E and the dry side 220E. On the dry side 220E, an ethernet cable 193E with male RJ-45 connector 120E may be used to connect to electronics on the dry side 220E, e.g., computers or sensors. In some embodiments, the outside diameter of the female bulkhead connector may be 1-2 inches.

The shell 160E of the in-line connector 130E may be fabricated from a metal. In some embodiments, the shell 160E may include flats 143E as shown in FIG. 2 to facilitate alignment with a locking collar 135 of FIG. 2 and to indicate proper alignment with the flat portion 149E of the female bulkhead connector 125E during mating. The shell 160E of the in-line connector 130E includes a reduced diameter portion/plug 132E, O-ring 128E in the O-ring groove 131E, and tapered (e.g. filleted or chamfered) distal edge 187E. The tapered edge 187E is designed to improve mating performance and allow gradual O-ring compression as the plug 132E of the in-line connector 130E is advanced into the bore 181E of the female bulkhead connector 125E.

The bore 177E serves as a "potting cup" to hold potting material around the ethernet cable 133E with a sufficient diameter to ensure a fully sealed pot (for example 1.5×the cable diameter), a taper 173E (e.g., a filet or chamfer) at the bottom of the potting cup may be included to improve adhesion of the potting material around the cable 133E. In some embodiments, a space between the cable 133E and stepped-down bore/hole 179E would contain a keyed or stabilizing plastic insert, epoxy, tape, or other fill.

A tapered (e.g. fileted or chamfered) edge 185E in the female bulkhead connector 125E is provided to improve the insertion of the in-line connector 130E plug 132E into the bore 181E of the female bulkhead connector 125E during mating.

The shell 165E of the female bulkhead connector 125E is typically made of metal or hard plastic. In some embodiments, space between the ethernet female-female RJ-45 adapter 110E and the stepped-down bore 117E may contain a keyed and/or stabilizing plastic insert, epoxy, tape, or another filling material. A dimension for the threaded shaft 113E may be a M20 thread in metric system, or a ⅞-14 thread for a standard size.

The mating of the in-line connector 130E with the female bulkhead connector 125E is carried out through the following steps:

1. The in-line connector 130E is distally advanced with its flat portion 143E aligned with the flat portion 149E of the female bulkhead connector and the RJ-45 male connector 115E aligned with the female adapter 110E inside of the female bulkhead connector 125E until the plug 132E lies within the bore 181E of the female bulkhead connector 125E. A guideline on one side of the surfaces of the male in-line connector 130E and female bulkhead connector 125E may be added to prevent the user from inserting the male in-line connector 130E 180 degrees from alignment.
2. The in-line connector 130E is further advanced until the RJ-45 plug 115E engages the female RJ-45 adapter 110E of the female bulkhead connector 125E.
3. Mating is completed when the in-line connector 130E is then fully advanced to fully insert its male RJ-45 connector 115E into the female-female adapter 110E of the female bulkhead connector 125E with the O-ring 128E of the in-line connector 130E forming a bore seal with the inside surface of the bore 181E of the female bulkhead connector 125E.

The wet side 200E of the DCMS 100E is fully sealed from the dry side 220E when the in-line connector 130E is fully mated with the female bulkhead connector 125E that is sealed to the bulkhead 150 via O-ring 123E. In this state, the plug 132E is sealed into the bore 181E with O-ring 128E, and the cable 133E is potted into the bore 177A of the in-line connector 130E with epoxy or another potting compound 141E.

Other aspects of the DMCS 100E may utilize features shown in FIGS. 2 and 3A.

In some embodiments, the groove 131E is positioned distally on the plug 132E such that the O-ring 128E "sweeps" out any water between in-line connector and bulkhead connector during disassembling.

FIG. 3D is a cross-section of a coaxial connector/RF version of the DMCS 100A having a female bulkhead connector 125A and a male in-line connector 130A. The female bulkhead connector 125A is configured with the shell 165A which has a bore 181A with distal surface 191A, a flat surface 149A, and a threaded section 113A. An O-ring 123A disposed in an O-ring groove 183A is sealed against the wet side 200A of the bulkhead 150 of a pressure vessel when the nut 121A is tightened to compress the O-ring 123A against the wet side 200A surface of the bulkhead 150. A male-male coaxial cable adapter 110A is inserted in the bore 117A inside of the threaded section 113A of the female bulkhead connector 125A.

The in-line connector 130A includes a COTS coaxial cable 133A with a female coaxial cable slip-on connector 115A. The cable 133A is potted into the potting cup/bore 177A and reduced diameter bore 179A in the in-line connector 130A using potting material 141A. A strain relief (not shown) may be added to further stabilize the coaxial cable 133A during and after the potting process. The female coaxial cable connector 115A potted material 141A with the distal end aligned with the distal end of the shell 150A having a tapered (i.e. filleted or chamfered) edge 187A.

The proximal edge of a male-male coaxial cable adapter 110A is aligned such that it is flush with the distal end of the bulkhead connector bore 191A. The bulkhead 150 separates the wet side 200A and the dry side 220A. On the dry side 220A, a coaxial cable 193A with female coaxial slip-on or screw-on connector 120A may be used to connect to electronics on the dry side 220A, e.g., data acquisition systems or sensors. In some embodiments, the outside diameter of the DMCS 100A may be between 0.5 and 1 inch.

The shell 160A of the in-line connector 130A may be fabricated from a metal. In some embodiments, the shell 160A has flattened portions 143A similar to the embodiment shown in FIG. 2 to facilitate alignment of the female bulkhead connector 125A with a locking collar (not shown) similar to that of the locking collar 135 of FIG. 2. The shell 160A of the in-line connector 130A includes a reduced diameter portion/plug 132A, O-ring 128A in the O-ring groove 131A, and tapered (e.g. filleted or chamfered) distal edge 187E. The tapered edge 187A is provided to improve mating performance and allow gradual O-ring compression as the plug 132A of the in-line connector 130A is advanced into the bore 181A of the female bulkhead connector 125A during mating.

The bore 177A serves as a "potting cup" to hold potting material around the coaxial cable 133A with sufficient diameter to ensure a fully sealed pot (for example 1.5×the cable diameter). A taper 173A (e.g., a filet or chamfer) at the bottom of the potting cup 177A may be included to improve adhesion of potting material around the cable 133A. In some embodiments, the space between the cable 133A and the stepped-down bore/hole 179A would contain a keyed or stabilizing plastic insert, epoxy, tape, or other filling material.

A tapered (e.g., fileted or chamfered) edge 185A in the female bulkhead connector 125A is designed to improve guidance of the in-line connector 130A plug 132A into the bore 181A of the female bulkhead connector 125E.

The shell 165A of the female bulkhead connector 125A may be fabricated from a metal or a hard plastic. In some embodiments, the space between the male-male coaxial cable adapter 110A and the stepped-down bore 117A would contain a keyed and/or stabilizing plastic insert, epoxy, tape, or other fill 142A. A typical dimension for the threaded shaft 113A would be a M12 thread if metric system, or a 7/16-20 thread for a standard size.

The mating of the in-line connector 130A with the female bulkhead connector 125A (sealed to the bulkhead 150) is carried out through the following steps:

1. The in-line connector 130A is distally advanced with the plug 132A inserted into the bore 181A.
2. The in-line connector 130A is further advanced until the coaxial cable female slip-on connector 115A engages the male-male coaxial cable adapter 110A inside the bore 181A of the female bulkhead connector 125A.
3. Mating is completed when the in-line connector 130A is advanced to fully insert its female coaxial cable connector 115A onto the male-male coaxial adapter 110A of the female bulkhead connector 125A with the O-ring 128A of the in-line connector 130A forming a bore seal with the inside surface of the bore 181A of the female bulkhead connector 125A.

The wet side 200A is fully sealed from the dry side 220A when the in-line connector 130A is fully mated to the female bulkhead connector 125A, that is sealed to the bulkhead 150 via O-ring 123A as the plug 132A is sealed into the bore 181A with O-ring 128A, and the cable 133A is potted into the bore 177A of the in-line connector 130A with epoxy or other potting compound 141A.

Other aspects of the DMCS 100A may utilize features shown in FIGS. 2 and 3A.

In some embodiments, the O-ring groove 131A is positioned distally on the plug 132A such that O-ring 128A "sweeps" out any water between in-line connector and bulkhead connector during disassembling.

Figures 4A, 4B:
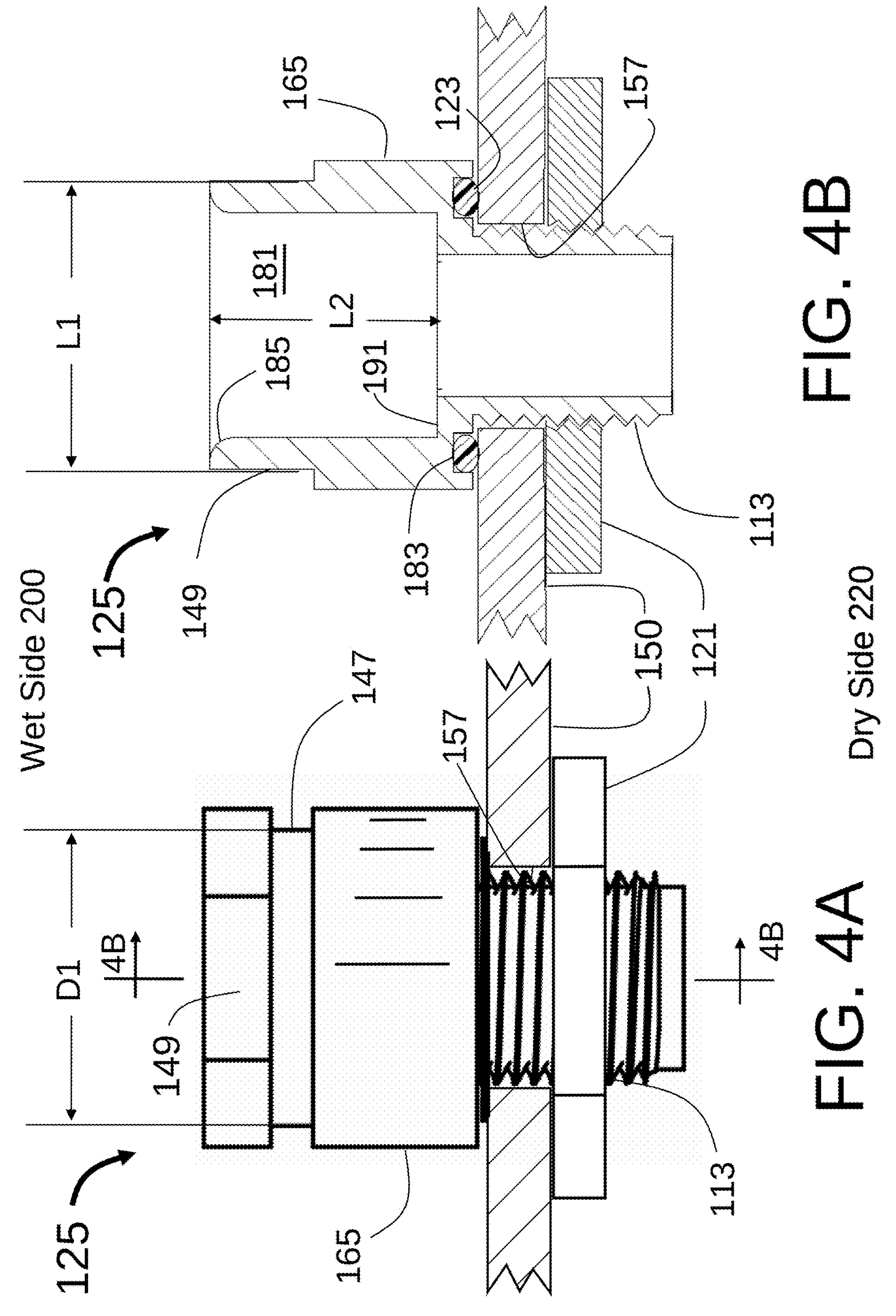
FIG. 4A is a side view of an embodiment of the body of the subject DMCS female bulkhead connector.
FIG. 4B is a cross-sectional view of the subject DMCS female bulkhead connector taken along the line 4B-4B of FIG. 4A.

FIG. 4A is a side view of an embodiment of the body of a DMCS female bulkhead connector 125 of FIG. 2 with its threaded section 113 placed through the hole 157 in the bulkhead 150 and secured to the dry side 220 of the bulkhead 150 with the nut 121. The shell 165 of the female bulkhead connector 125 has a locking groove 147 and a flat portion 149.

FIG. 4B is a longitudinal cross-section of the body of the DMCS female bulkhead connector 125 taken along lines 4B-4B of FIG. 4A. The female bulkhead connector 125 is configured with the bore 181 having a depth L2 and a distal bore surface 191. The female bulkhead connector 125 also has the shell 165 with threaded section 113 placed through the hole 157 in the bulkhead connector 150.

The shell 165 also has a flat portion 149 used for alignment with a locking collar such as the locking collar 135 of FIG. 2. The nut 121 secures the female bulkhead connector 125 to the wet side of the bulkhead 150 using the compressing the O-ring 123 disposed in the O-ring groove 183 to provide a waterproof seal between the female bulkhead connector 125 and the bulkhead 150.

Another important feature of the female bulkhead connector 125 is the taper 185 that facilitates smooth O-ring compression for the in-line connector 130 or dummy plug 137 of FIG. 2. It is also envisioned that the female bulkhead connector 125 can be screwed into a threaded hole 155 shown in FIG. 2 (not shown FIG. 4B) rather than using a nut 121 to provide compression on the O-ring 123 to seal the female bulkhead connector 125 to the bulkhead 150. The diameter D1 of the groove 147 equals the distance L1 between flat sections such that a locking collar 137 (not shown) may pass over the flat segments then twist to lock (as depicted in FIG. 8).

Figure 5:
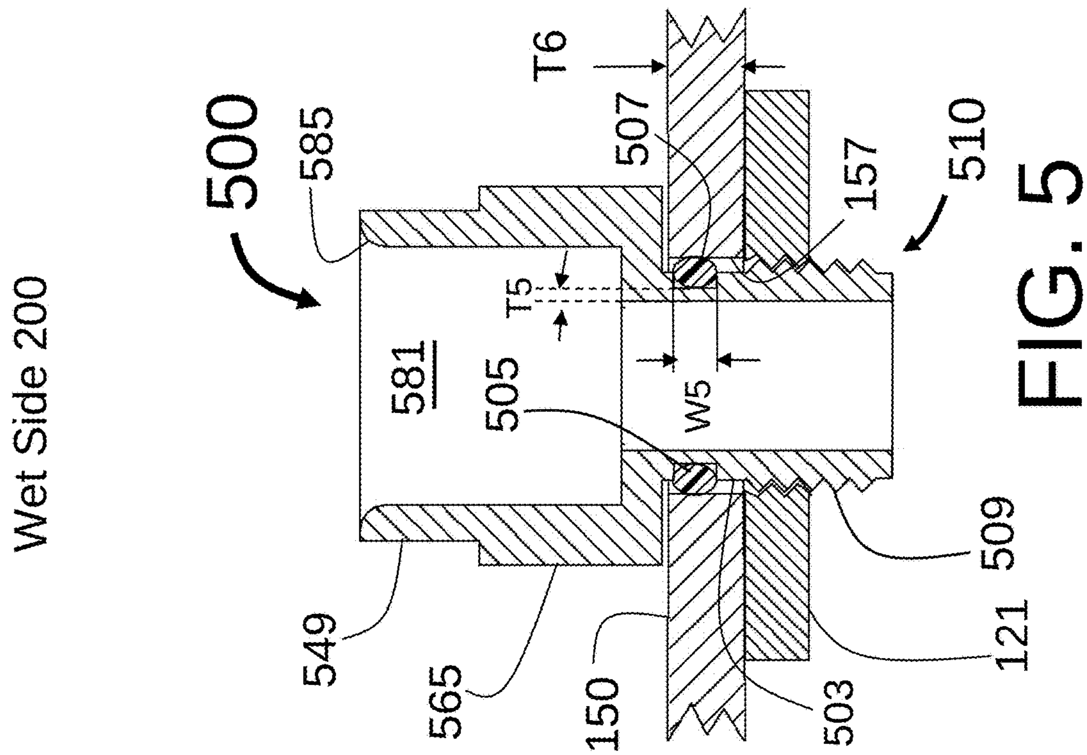
FIG. 5 is a cross-sectional view of another embodiment of the body of the subject DMCS female bulkhead connector.

FIG. 5 is a longitudinal cross-section of another embodiment of the body of a DMCS female bulkhead connector 500 having a shell 565 with a flat section 549. The female bulkhead connector 500 differs from the female bulkhead connector 125 of FIGS. 4A-4B as it uses a bore O-ring 523 in an O-ring groove 583 (having the width W5) on the proximal cylindrical portion 503 of the otherwise threaded distal shaft 550 with the threaded section 533 of the female bulkhead connector 500. When inserted into the hole 157 in the bulkhead 150, the O-ring 523 and secured by the nut 121, a bore seal is formed between the female bulkhead connector 500 and the bulkhead 150.

To create an effective bore seal, the thickness T6 of the bulkhead 150 must be at least twice the width W5 of the O-ring groove 583. The O-ring groove 583 is positioned on the bulkhead connector plug/shaft 550 such that the O-ring 523 is fully compressed within the bulkhead hole 157.

The nut 121 screwed onto thread 509 is not a required feature for O-ring compression, but is a preferred method of ensuring the connector remains in place within the bulkhead 150. In an alternative embodiment, no nut is used, but a vacuum is utilized to hold the pressure vessel closed.

A tapered portion 585 of the shell 565 facilitates an easier insertion of a couplable connector such as the in-line connector 130 of FIG. 2 and allows a gradual compression of the O-ring 128 of FIG. 2 into the bore 581 for improved sealing.

The interior surface of the hole 157 is the bore sealing surface that matches the specification for a male bore seal found in the Parker O-ring handbook, with a finish having a roughness average (RA) of less than 12 microinches to ensure a sufficient seal. To achieve this finish, a finishing process such as lathe cutting/boring, milling, and/or reaming is preferred. The wall thickness T5 behind the bore O-ring groove 505, is the minimum dimension that will dictate the O-ring 523 and the thread size based on the desired maximum water depth.

Figure 6:
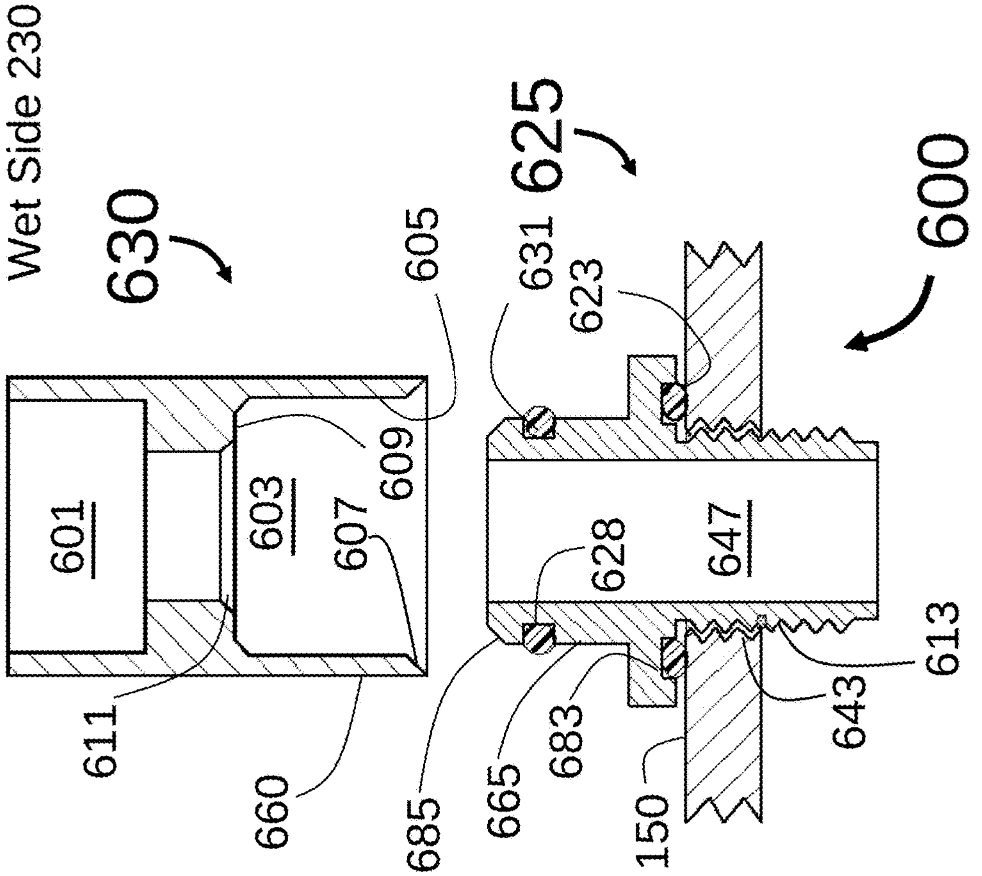
FIG. 6 is a cross-sectional view of an embodiment of the subject DMCS configured with a male bulkhead connector and a female in-line connector.

FIG. 6 is a longitudinal cross-section of an embodiment of a DMCS 600 configured with a male bulkhead connector 625 and a female in-line connector 630. The male bulkhead connector 625 has a shell 665 with a threaded section 613 that can be screwed into the threaded hole 155 in the bulkhead 150 and advanced to compress the O-ring 623 in O-ring groove 683 to form a face seal to the wet side 230 of the bulkhead 150. The shell 665 has a bore 647 and a bore seal O-ring 628 in an O-ring groove 631 near the proximal end of the shell 665. A taper 685 on the proximal end of male bulkhead connection 625 improves the centering during mating.

The shell 660 of the female in-line connector 630 may be fabricated from a metal or a rigid plastic. The shell 660 has a bore/potting cup 601 of sufficient diameter to ensure pot coverage and that can contain bottom taper. The shell 660 also includes a bore 603 with the bore surface 605, taper (filet or chamfer) 607, a proximal bore surface 609, and an optional electrical connector mating taper (chamfer or fillet) 611. Specifications and dimensions for the bore surface 605 are similar to that of the surface of the bore 181 of female bulkhead connector 125 of FIG. 3A. In other embodiments where the male bulkhead connector 625 is placed through a straight hole 157 in the bulkhead 150 (not shown), a nut similar to the nut 121 of FIG. 4B can be tightened over the threaded section 613 to compress the O-ring 623.

Preferred dimensions for the face seal features of the male bulkhead connector 625 are identical for to those used for the female bulkhead connector 125 of FIG. 5 including specifications for the O-ring 623 and the O-ring groove 683 being identical to the O-ring 123 and the O-ring groove 183 of FIG. 5. The bore O-ring 628 is disposed in the bore O-ring groove 631 that may, for example, have identical specifications and dimensions to the bore O-ring 128 and the O-ring groove 131 of the in-line connector 130 of FIG. 2. The shell 665 of the male bulkhead connector 625 mat be fabricated from a metal or a rigid plastic, similar to the female bulkhead connector 125 of FIG. 4B.

Figure 7:
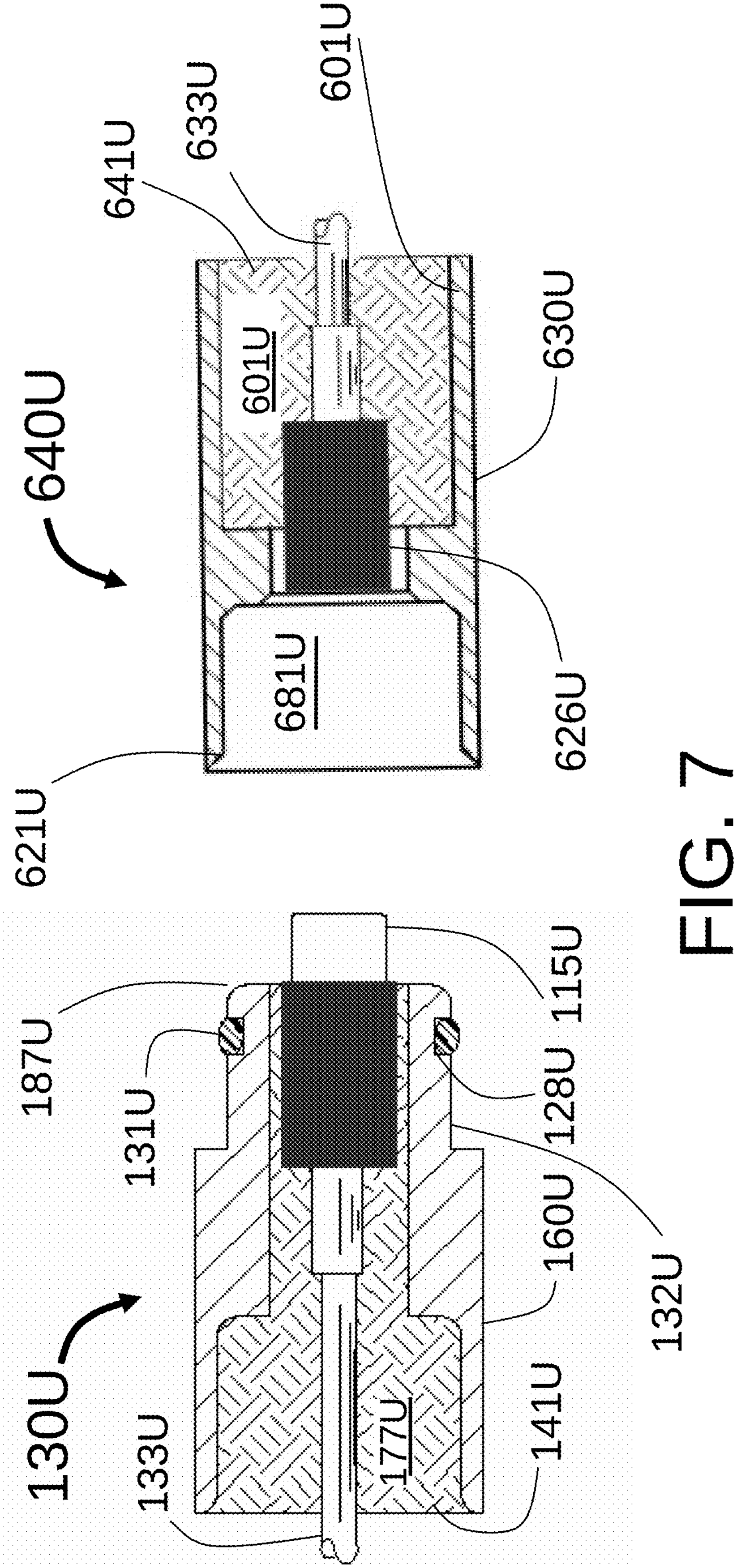
FIG. 7 shows a longitudinal cross-section of an embodiment of the subject DCMS configured with the male and female in-line connectors that provide a sealed cable-to-cable connection.

FIG. 7 is a longitudinal cross-section of an embodiment of the DMCS 700U that provides a sealed cable-to-cable connection using a male in-line connector 130U that can be mated to a female in-line connector 640U. The male in-line connector 130U is also shown in FIG. 3A and has the shell 160U and the USB-C cable 133U with the male connector 115U potted with material 141U into the potting cup/bore 177U.

The O-ring 128U is inserted in the O-ring groove 131U located near the distal end of the reduced diameter portion/plug 132U of the shell 160U. The plug 132U has a tapered distal end 187U to facilitate insertion into the bore 681U of the female in-line connector 630U. The female in-line connector 640U is configured with a taper 621U, shell 630U, USB-C cable 633U and a potting cup/bore 601U potted with potting material 641U.

The mating of the male in-line connector 130U and the female in-line connector 640U involves aligning the male USB-C connector 115U with the female USB-C connector 626U as the plug 132U is inserted into the bore 681U that, due to the tapers 187U and 621U, will gradually compress the O-ring 128U as the two connectors are brought together. Full mating occurs when the plug 132U is maximally advanced where the male USB-C connector 115U is connected into the female USB-C connector 626U, and the O-ring 128U forms a waterproof bore seal against the outside of the bore 681U. It is contemplated that some embodiments of the present connector system would include features to promote proper alignment of the USB-C connectors 115U and 626U as shown in FIGS. 12A-14C.

Figures 8A, 8B, 8C, 8D, 8E:
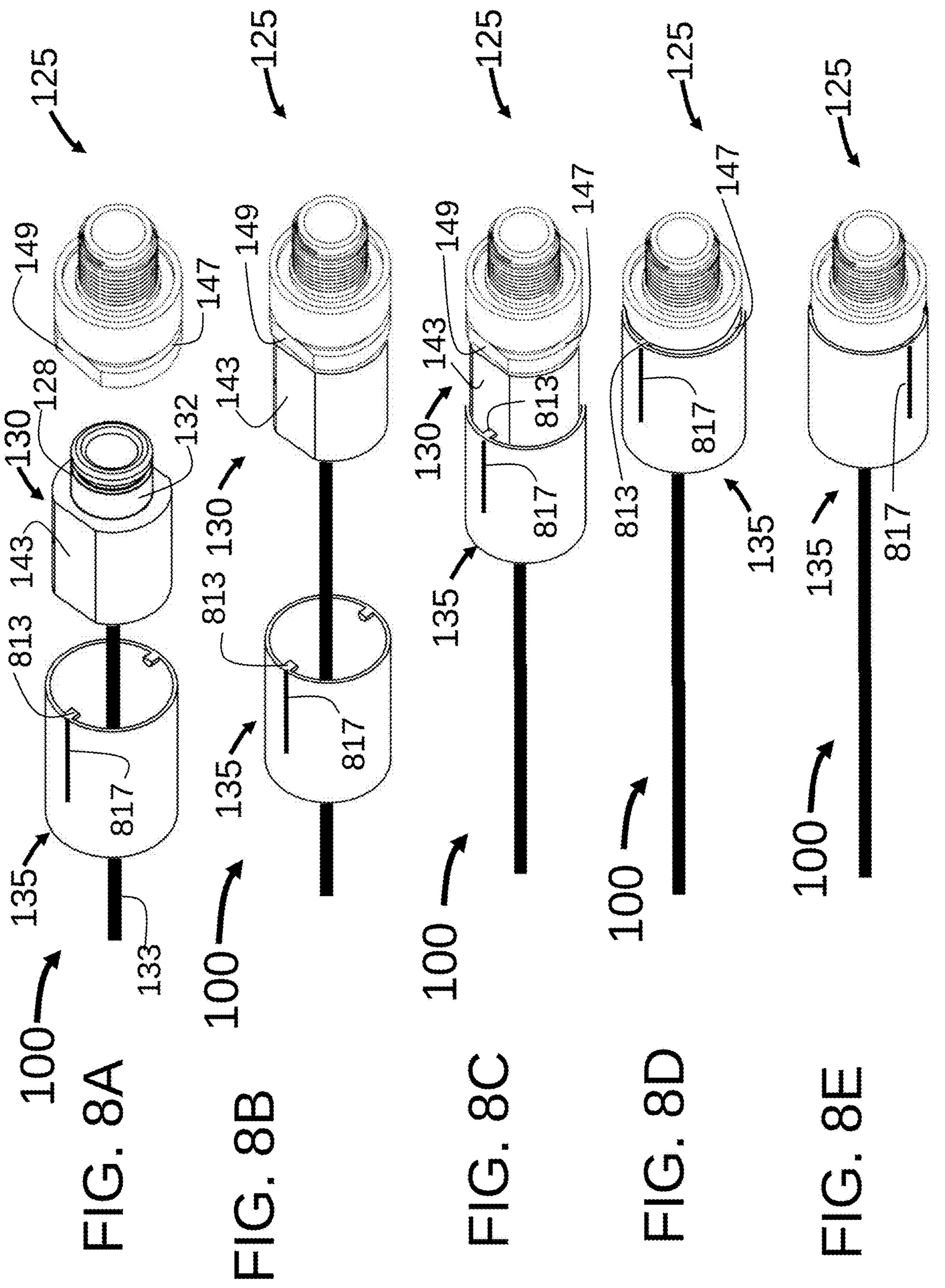
FIGS. 8A-8E depict the sequence of assembling steps for mating and locking the subject DMCS male in-line connector to a female bulkhead connector, with FIG. 8A showing the DMCS components prior to the assembling process, FIG. 8B showing the DMCS male in-line connector aligned and mated to the female bulkhead connector, FIG. 8C showing the DMCS locking collar aligned to the mated male in-line connector, FIG. 8D showing the aligned locking collar fully advanced over the male in-line connector and a portion of the female bulkhead connector before locking, and FIG. 8E showing the locking collar rotated to lock the DMCS.

FIGS. 8A-8E depict schematically the following steps for mating and locking the DMCS 100 male in-line connector 130 to a female bulkhead connector 124 with the locking collar 135:

FIG. 8A shows a schematic view of the DMCS 100 components before the mating process begins. These components include the locking collar 135 with marked line/lines 817 and pins 813, the male in-line connector 130 with cable 133, flat portions 143, and plug 132 with O-ring 128. Also shown is the female bulkhead connector 125 with the flat portion 149 and the locking groove 147. A line 817 marks each of the pins 813. The embodiment with two lines 817 is appropriate for symmetric COTS connectors, while asymmetric connectors would have only one line 817.

FIG. 8B shows the DMCS 100 male in-line connector 130 aligned and distally advanced to mate to the female bulkhead connector 125 with the flat portions 143 of the in-line connector 130 lined up with the flat portions 149 of the female bulkhead connector 125 where such alignment also will cause alignment of the internal COTS connectors. The locking collar 135 with pins 813 is not yet engaged.

FIG. 8C shows the DMCS 100 locking collar 135 with the pins 817 aligned and distally advanced over the center of the flat portions 143 of the male in-line connecter 130 now mated to the female bulkhead connector 125. The lines 817 assist in visualization of the position of the pins 813. In some embodiments, an additional line on the flat portion 143 of the male in-line connector 130 can be added to provide further guidance for proper alignment during mating.

FIG. 8D shows the DMCS 100 aligned locking collar 135 fully advanced over the male in-line connector 130 and a portion of the female bulkhead connector 125 with the pins 813 and the marked lines 817 positioned over the locking groove 147 before locking.

FIG. 8E shows the DMCS 100 locking collar 135 rotated into the locked position with moving marked lines 817 and pins 813 inserted into a deep section of the groove 147 to lock the DMCS 100 male in-line connector 130 and female bulkhead connector 125 together to prevent the accidental separation.

Alternative locking configurations are envisioned herein that may include the use of internal threads, latch strap, pins, screw or vacuum for preventing the mated connectors from relative longitudinal motion once mated.

FIGS. 9A-9H show alternative embodiments of dummy caps or plugs used to seal the wet side of a bulkhead connector or seal an in-line connector when otherwise unmated. A dummy plug or cap is applicable for usage at a full ocean depth and can be removed to allow a COTS connector or port in a bulkhead connector to be accessed when the system is recovered to the surface.

Various embodiments of dummy cap and plug assemblies may include a single or two piece locking collar and plug to provide a secured seal to a bulkhead or in-line connector. In cases where the dry-side pressure is less than the wet-side pressure, a user may prefer to forgo the locking collar as the pressure differential will retain the dummy cap or plug. Male dummy plugs are used to seal to a female bulkhead or male in-line connector while female dummy caps are used to seal to a male bulkhead or male in-line connector.

FIG. 9A is a schematic view of an embodiment of the DMCS 100 male dummy plug 137 designed to mate with an embodiment of the DMCS female bulkhead connector such as the female bulkhead connector 125 shown in FIGS. 2, 4A and 4B. The male dummy plug 137 has a reduced diameter portion/plug 932 with the distal O-ring 928 in the O-ring groove 931, a top cylinder 914, a groove to improve grip for removal 913 and a taper (filet or chamfer) 916. In some embodiments, the male dummy plug 137 would have a diameter D9 that matches the inner diameter of the groove 147 on female bulkhead connector 125 of FIG. 4A. The bottom edge taper 916 ensures smooth mating with the female in-line connector or the female bulkhead connector.

Figure 9C:
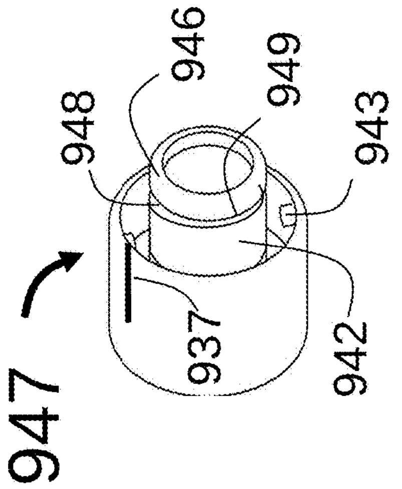
FIG. 9C depicts an embodiment of the DMCS male dummy plug with an integrated locking collar.
Figure 9D:
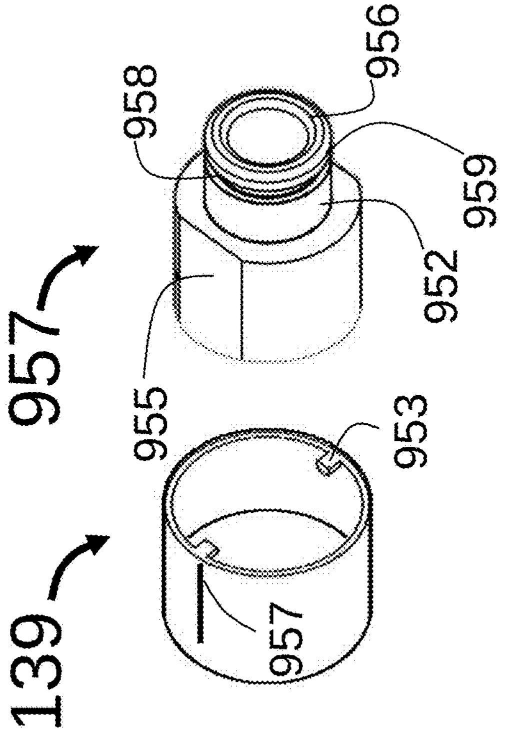
FIG. 9D shows an embodiment if the DMCS male dummy plug having a separate locking collar.
Figure 9A:
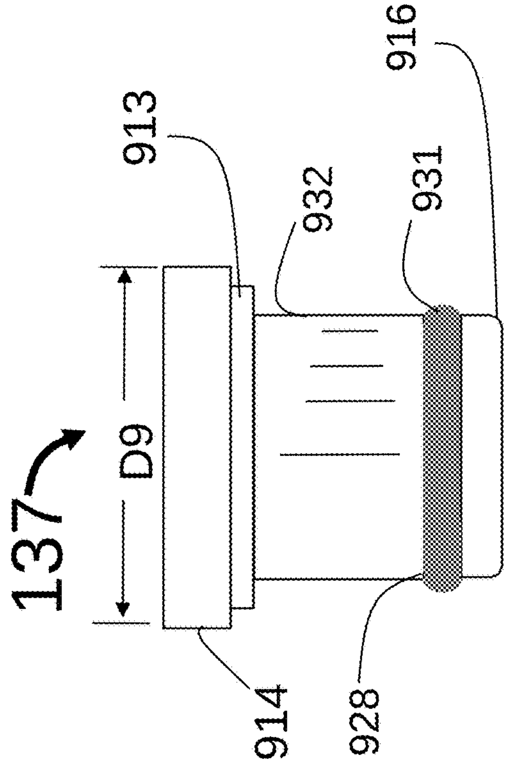
FIG. 9A is a representation of an alternative embodiment of the male dummy plug of the subject DMCS designed to mate with the embodiment of the DMCS female bulkhead connector shown in FIGS. 2, 3A-3D, 4A, 4B and 5, and with the DMCS female in-line connector shown in FIG. 6 or 7.
Figure 9B:
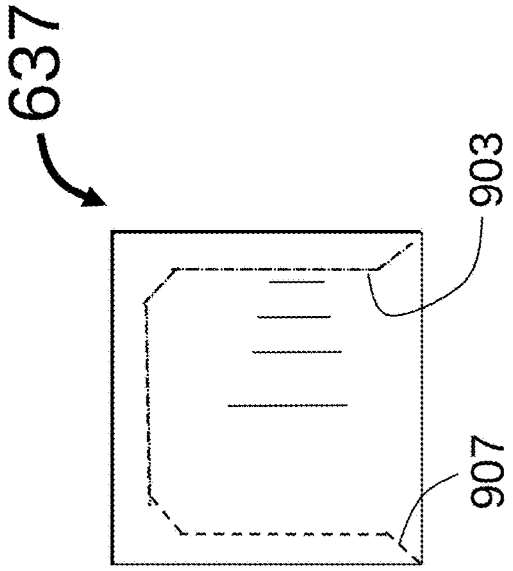
FIG. 9B shows a female dummy cap embodiment of the subject DMCS designed to mate with the embodiment of the DMCS male bulkhead connector shown in FIG. 6 or the DMCS male in-line connector shown in FIGS. 2 and 3A-3D.

FIG. 9B is a schematic view of an embodiment of a DMCS female dummy cap 637 designed to mate with an embodiment of the DMCS male bulkhead connector or the male in-line connector such as the male bulkhead connector 625 shown in FIG. 6 or the male in-line connector 130 of FIG. 2. Some embodiments of the female dummy cap 637 have an inner bore 903 with a similar surface finish as for the bore 603 of the female in-line connector 630 of FIG. 6. The female dummy cap 637 also has a tapered (fileted or chamfered) edge 907 for gradual O-ring compression during mating.

FIG. 9C is a schematic view of the embodiment of a DMCS male dummy plug 947 with an integrated locking collar having pins 943 with the guide line 937 and the reduced diameter portion/plug 942 with the O-ring 948 in the O-ring groove 949 and the distal taper 946. When there is no electrical component, this single-piece dummy is a preferred option as opposed to the two piece locking embodiment shown in FIG. 9D.

FIG. 9D is a schematic view of the DMCS male dummy plug 957 having a separate locking collar 139. The locking collar 139 functions similar to the locking collar 137 of FIGS. 8A-8E where the pins 953 with the guidelines 957 are aligned with the center of the flat portion 955 of the dummy plug 957 and are rotated to engage to bulkhead connector groove 147 as shown in FIGS. 8A-8E. The locking collar 139 can also be fitted over the dummy plug 137 of FIGS. 2 and 9A, where the flats 955 are not used, and the dimension D9 of the dummy plug 138 of FIG. 9A is less than, or equal to, the diameter of the female bulkhead connector 125 of FIGS. 2 and 8A-8E.

The bore surface 952 has the distal O-ring groove 958 with the O-ring 959 and tapered feature 956. It is also envisioned that one, or more, guidelines can be added to the dummy plug 957 to assist in guiding the locking collar 139 over the dummy plug 957.

Figure 9F:
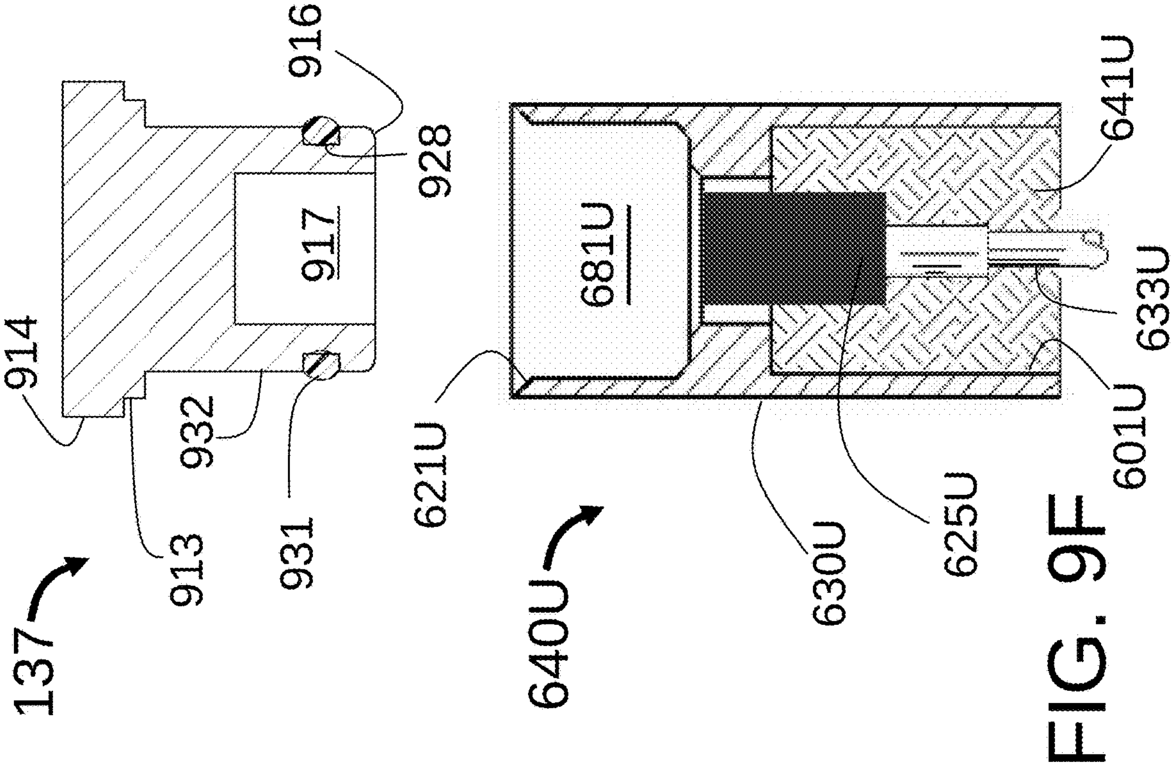
FIG. 9F is a cross-sectional view of the male dummy plug of FIG. 9A configured with the female in-line connector of FIG. 7.
Figure 9E:
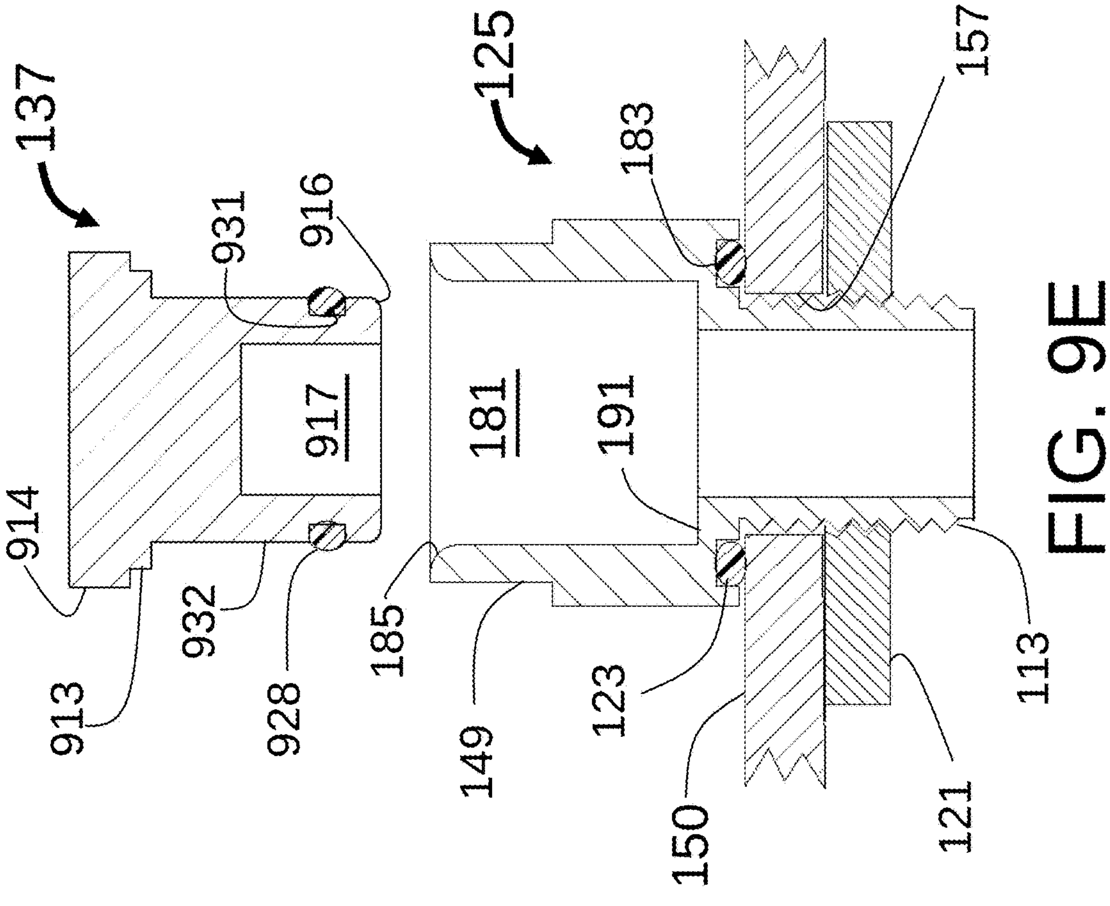
FIG. 9E is a cross-sectional view of the male dummy plug of FIG. 9A configured with the female bulkhead connector of FIGS. 4A and 4B.

FIG. 9E is a longitudinal cross-section of the male dummy plug 137 of FIG. 9A with the female bulkhead connector 125 of FIGS. 4A and 4B as they are aligned for mating.

The female bulkhead connector 125 is similar to that shown in FIG. 4B with the threaded section 113, the O-ring 123 in the O-ring groove 183, the taper 185, the flat portion 149 and the bore 181 with the distal bore surface 191. The threaded section 113 of the female bulkhead connector 125 is inserted through the hole 157 in the bulkhead 150 and secured with the nut 121 which, when tightened, compresses the O-ring 123, thus sealing the female bulkhead connector 125 to the bulkhead 150.

The male dummy plug 137 has a bore 917, the reduced diameter portion/plug 932 with the distal O-ring 928 in the O-ring groove 931, a proximal cylinder 914, a groove 913 to improve grip for removal and a distal taper (filet or chamfer) 916. The distal taper 916 ensures smooth mating with the female bulkhead connector 125 as the plug 932 is inserted into the bore 181 of the female bulkhead connector 125.

FIG. 9F is a longitudinal cross-section view of the male dummy plug 137, also shown in FIG. 9E, that can be mated to the female in-line connector 640U also shown in FIG. 7. The male dummy plug 137 has the bore 917, the reduced diameter portion/plug 932 with the distal O-ring groove 931 with the O-ring 928, the distal cylinder 914, the groove 913 to improve grip for removal, and the distal taper (filet or chamfer) 916. The female in-line connector 640U has a bore 681U, a taper 621U, a shell 630U, a USB-C cable 633U with a female connector 626U, and a potting cup/bore 601U filled with a potting material 641U.

Figure 9H:
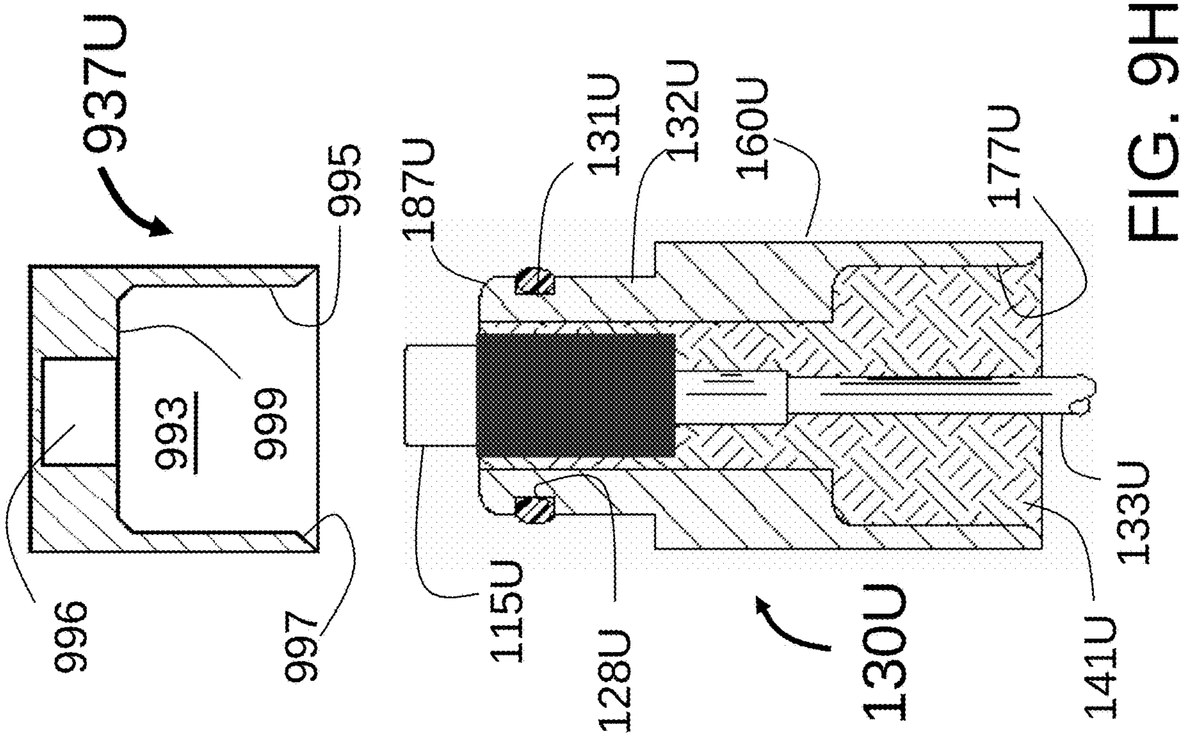
FIG. 9H is a cross-sectional view of an embodiment of the subject DMCS having the female dummy cap with the male in-line connector also shown in FIGS. 3A and 7.
Figure 9G:
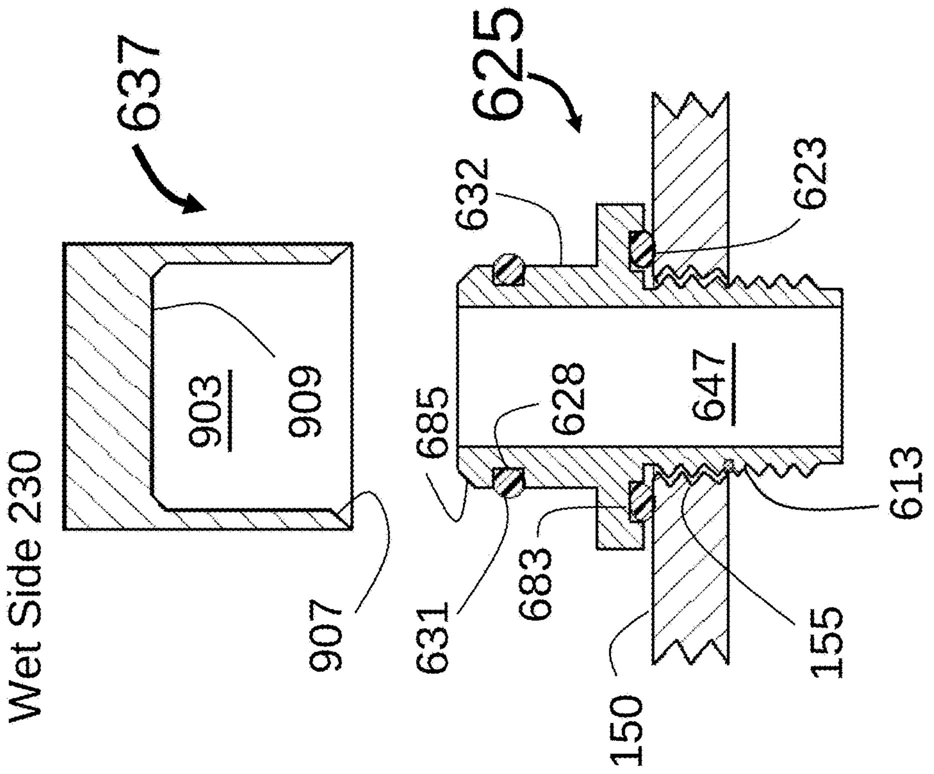
FIG. 9G is a cross-sectional view of the female dummy cap of FIG. 9B configured with the male bulkhead connector of FIG. 6.

FIG. 9G is a longitudinal a cross-section of the female dummy cap 637, also shown in FIG. 9B, with the male bulkhead connector 625, also shown in FIG. 6. The female dummy cap 637 with the taper 907, bore 903 and distal bore surface 909 is designed to seal over the outside of the plug 632 of the male bulkhead connector 625.

The male bulkhead connector 625 has a taper 685, bore 647 and a threaded section 613 that can be screwed into the threaded hole 155 in the bulkhead 150 and tightened to compress the O-ring 623 in the O-ring groove 683 to form a face seal to the wet side 230 of the bulkhead 150. The male bulkhead connector 625 has a reduced diameter section/plug 632 having a bore seal O-ring 628 in an O-ring groove 631 designed to form a bore seal against the outside of the bore 903 in the dummy cap 637 when the dummy cap 637 and male bulkhead connector 625 are mated.

FIG. 9H is a longitudinal cross-section of the female dummy plug 937U with the MILC 130U, also shown in FIGS. 3A and 7. The dummy plug 937U includes a hole 996, a bore 993 with bore bottom 999 and bore surface 995, and a taper 997.

Also shown is an embodiment of a MILC 130U aligned for mating with the female dummy plug 937U. A COTS USB-C cable 133U is potted with a potting material 141U such as epoxy or urethane into the potting cup/bore 177U of the MILC 130U. The male USB-C connector 115U of the cable 133U is offset such that it protrudes beyond the tapered (filleted or chamfered) edge 187U of the MILC 130U. The shell of the MILC 160U may be fabricated from a metal. External features of the shell 160U include a reduced diameter/plug 132U and an O-ring 128U in O-ring groove 131U.

The bore O-ring 128U in the MILC 130U mates to the inner bore 993 of the female dummy cap 937U with the connector 115U designed to fit in the hole 996 when the dummy cap 937U is mated over the in-line connector 130U.

In some preferred embodiments, the tapered features 187U and 997 improve guidance of the dummy cap 937U into the MILC 130U, ensuring gradual compression of the O-ring 128U.

Figures 10A, 10B, 10C:
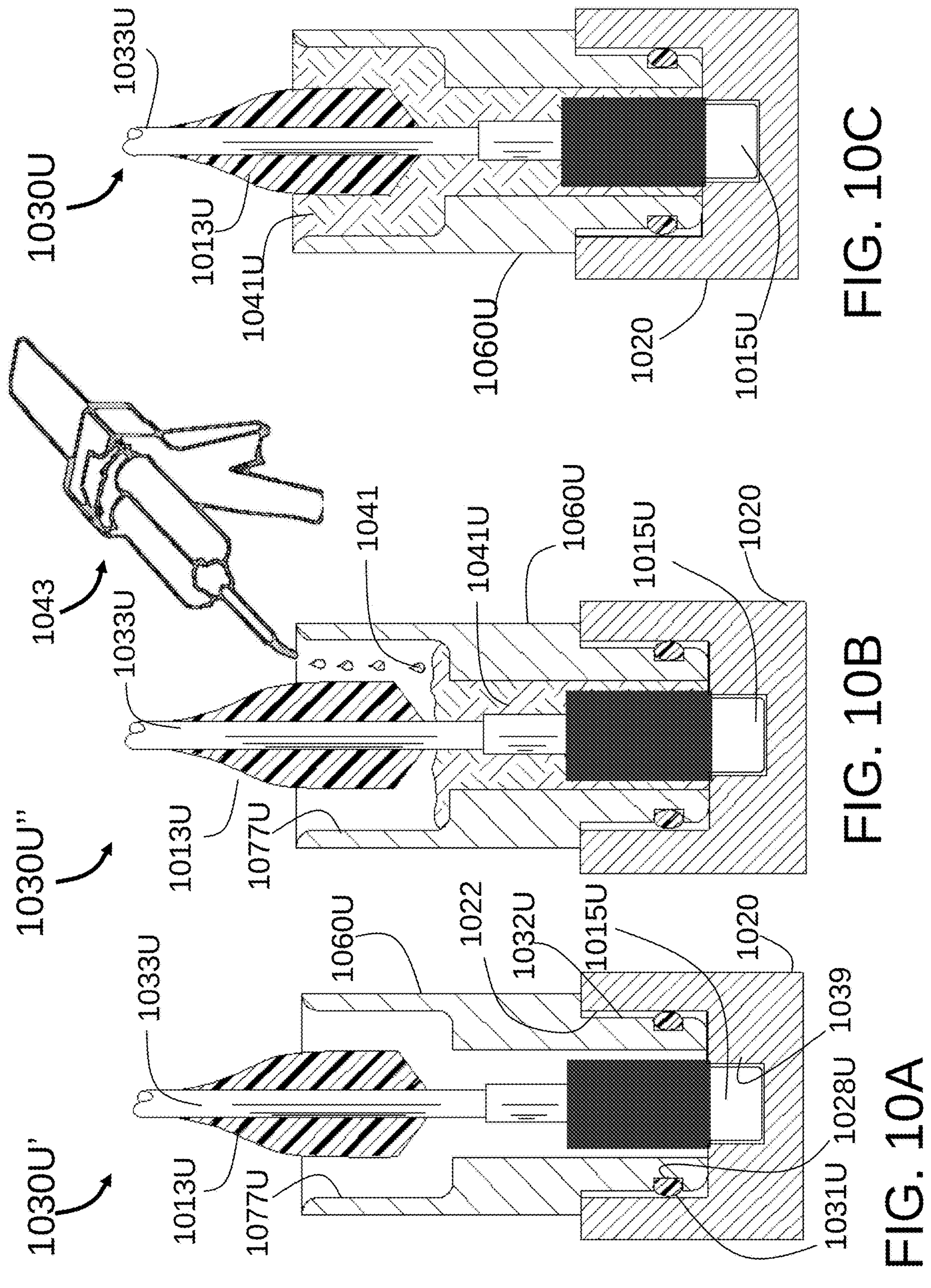
FIGS. 10A-10C depict the sequence of steps in an example of the potting process utilized to create the embodiment of the DMCS USB-C male in-line connector with FIG. 10A showing a longitudinal cross-section of the male in-line connector having a cable strain relief before potting, FIG. 10B showing a cross-section of the male in-line connector having a cable strain relief during potting, and FIG. 10C showing a longitudinal cross-section of the potted male in-line connector having a cable strain relief after the potting process is completed.

FIGS. 10A-10C show the steps in an example of the potting process utilized to create an embodiment of a DMCS USB-C male in-line connector 1030U. The process depicted in FIGS. 10A-10C is primarily applicable to creation of shallow-water (<200 m) underwater cables.

FIG. 10A is a longitudinal cross-section of an embodiment of the male in-line connector 1030U' before the start of the potting process. The male in-line connector 1030U' has a shell 1060U with a bore 1077U, USB-C cable 1033U with a cable strain relief 1013U and a male connector 1015U, and a reduced diameter section/plug 1032U with an O-ring 1028U in an O-ring groove 1031U. The plug 1032U is inserted into the potting fixture 1020 with a bore 1022 and insert hole 1039, where the O-ring 1028U forms a bore seal against the outside of the potting fixture bore 1022. The insert hole 1039 provides a space for the male USB-C connector 1015U during potting.

Prior to potting, a plastic strain-relief collar 1013U can be attached to the cable. This feature provides positioning and strain relief for the cable 1033U and helps prevent separation of the pot from the cable. Prior to potting, the in-line connector and cable must be prepared according to the manufacturer instructions of the potting compound (e.g. epoxy or urethane). With cable strain relief 1013U, structural adhesives (e.g. 3M DP604NS, 3M DP460) are viable options. Without a strain relief collar, softer urethanes or epoxies (e.g., 3M scotch cast 2131, DP420) may be used to improve performance and to lower the likelihood of separation between the cable 1033U and the pot 1041U.

FIG. 10B is a longitudinal cross-section of an embodiment of the male in-line connector 1030U" during the potting process, where the epoxy, or another potting material 1041, from an injector 1043 is injected into the potting cup/bore 1077U, where it solidifies into the solid potting material 1041U for completion of the pot between cable 1033U, strain relief 1013U, and shell 1060U where the fixture 1020 prevents leakage of potting compound around connector 1015U.

FIG. 10C is a longitudinal cross-section of the potted male in-line connector 1030U with the potting material 1041U filling and sealing the shell 1060U to the cable 1033U, strain relief 1013U, cable 1033U, and shell 1060U. Following the potting process, the male in-line connector 1030U is removed from the fixture 1020.

Figures 11A, 11B:
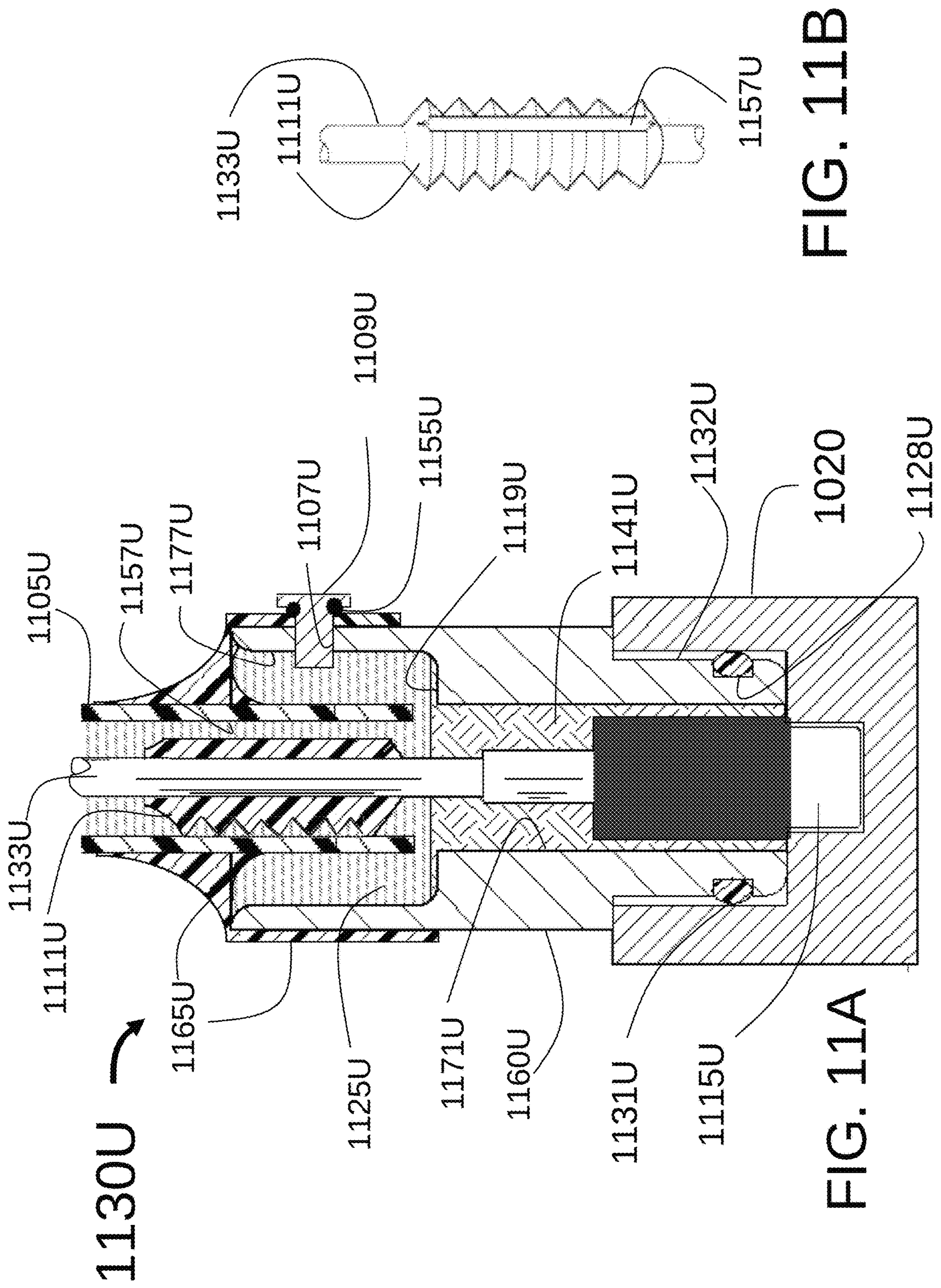
FIG. 11A shows a longitudinal cross-section of an embodiment of the DMCS male in-line connector capable of deep-water applications in a potting fixture.
FIG. 11B depicts a barbed cable collar on the cable for deep water embodiment of DMCS male in-line connector shown in FIG. 11A.

FIG. 11A is a longitudinal cross-section of an embodiment of the DMCS male in-line connector 1130U capable of deep-water applications in the potting fixture 1020. The potting fixture 1020 is also shown in FIGS. 10A-10C. The in-line connector 1130U includes a USB-C cable 1133U with USB-C connector 1115U and strain relief 1111U potted into the reduced diameter bore 1171U of the shell 1160U.

The shell 1160U also includes a main bore 1177U and a reduced diameter portion/plug 1132U with O-ring 1128U in O-ring groove 1131U.

Potting material 1141U secures the cable 1133U with the USB-C connector 1115U, and fully seals the connector 1115U from the main bore 1177U that is filled with oil 1125U. The potting material is filled slightly above the distal bore surface 1119U of the main bore 1177U, such that most of the main bore 1177U may be filled with oil. A scalloped plastic strain relief 1111U is fitted around the cable 1133U to support, seal and center a plastic tube 1105U to the cable. The collar 1111U includes an oil channel 1157U that allows the oil 1125U to flow from the main bore 1177U to into the plastic tube 1105U. A plastic sealing collar 1165U seals the plastic tube 1105U to the shell 1160U.

To provide suitability for deep water, the in-line connector 1130U forms one end of an oil-filled underwater cable with the oil 1125U filling the main bore 1177U and the lumen 1150U of the plastic tube 1105U. A threaded oil port 1107U into the shell 1160U of the USB-C in-line connector deep water shell 1160U is used for insertion of the oil 1125U. The plug is sealed in by a sealing screw 1109U which typically has an O-ring 1155U or gasket. The shell 1160U is otherwise similar to 160U shown for typical application in FIG. 3A. The sealing screw 1109U is typically screwed into the threaded oil port 1107U with O-ring 1155U to seal the port.

FIG. 11B is a schematic view of strain relief collar 1111U on the cable 1133U. The collar 1111U is barbed to support the tube 1105U and also provides strain relief for the cable 1133U. The plastic collar 1111U includes an oil channel 1157U.

Figure 11C:
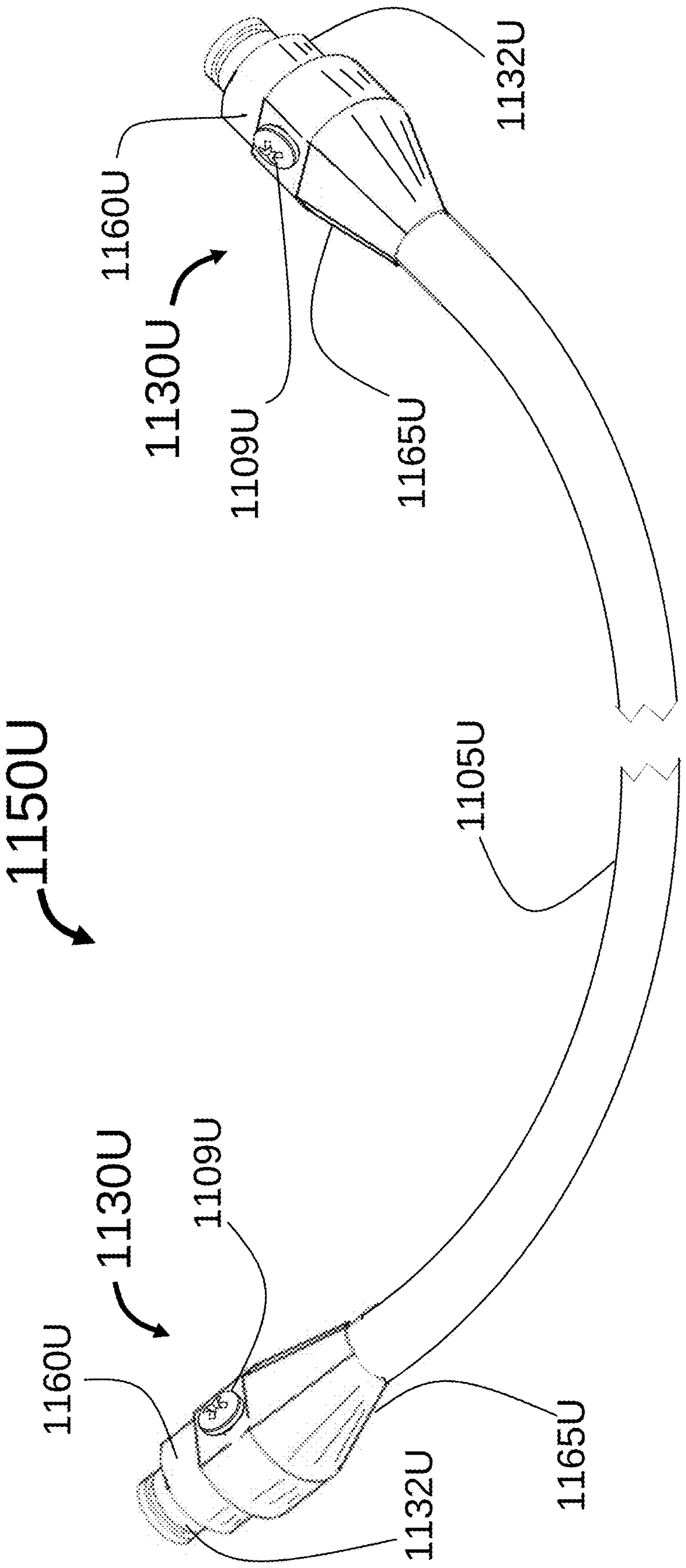
FIG. 11C shows an embodiment of a complete ready to use oil filled, deep-water cable having two male in-line connectors.

FIG. 11C. shows an embodiment of a complete ready-to-use cable 1150U having two male in-line connectors 1130U with a plug surface 1132U of shell 1160U, sealing collars 1165U with sealing screws 1109U connected by the oil filled plastic tube 1105U. While FIG. 11C shows a relatively short length of the tube 1105U, embodiments are envisioned of lengths limited only by the usable length of the COTS cable inside the oil filled tube 1105U.

To fill the cable 1150U with oil 1125U of FIG. 11A, both sealing screws 1109U are removed, and ends of the cable with in-line connectors 1130U are elevated. The cable 1150U is filled with oil from one end via the hole 1107U until oil completely fills the tube 1105U and begins to drip out of the hole 1107U at the other end. Once all air bubbles are excluded, both screws 1109U are re-engaged to seal the oil-filled cable 1150U. An oil pressure compensation bulb (not shown) may be added for deep submergence pressure equalization.

The use of an oil filled structure/tube to improve deep water performance of cables is often applied in current marine engineering. It is applied here to allow the present invention dry mate connector system to function up to full ocean depth of 6000 m.

Figure 12C:
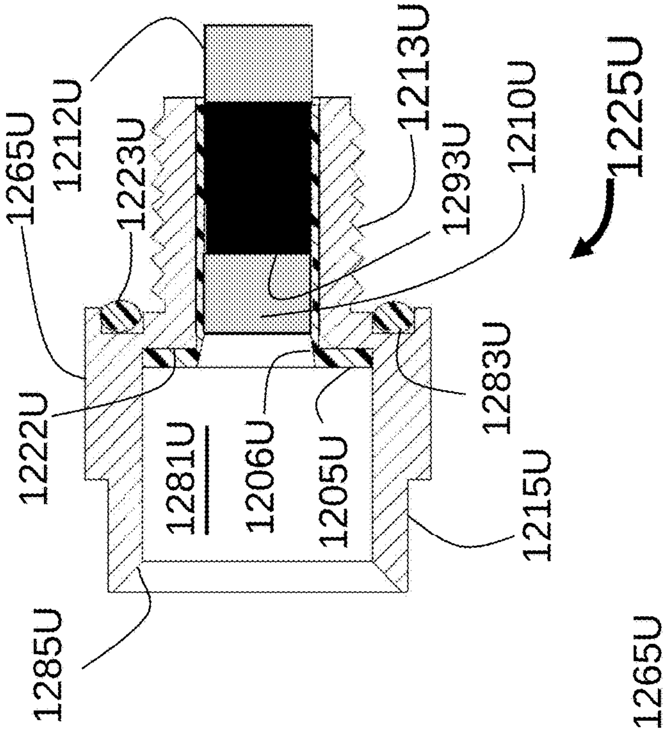
FIG. 12C a longitudinal a cross-section of the DMCS female USB-C bulkhead connector taken along the line 12C-12C of FIG. 12A.
Figure 12A:
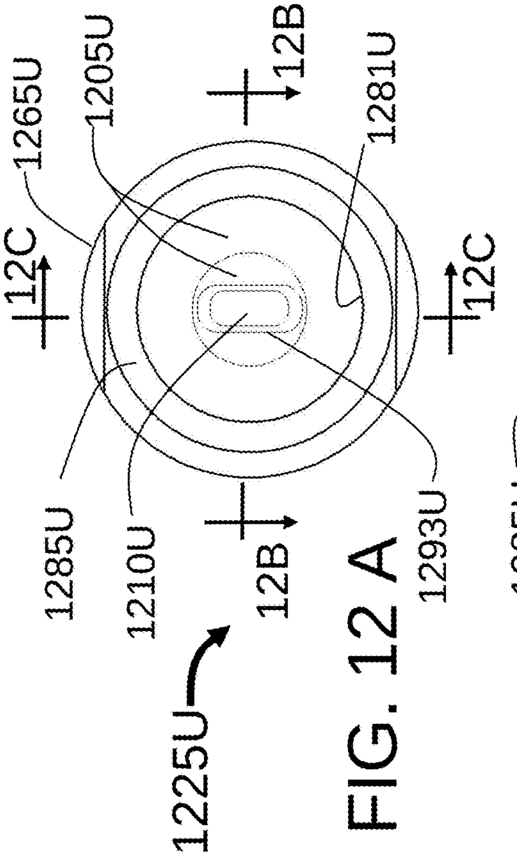
FIG. 12A is the top view of an embodiment of the DMCS female USB-C bulkhead connector having an internal insert comprising a USB-C male-female COTS connector.
Figure 12B:
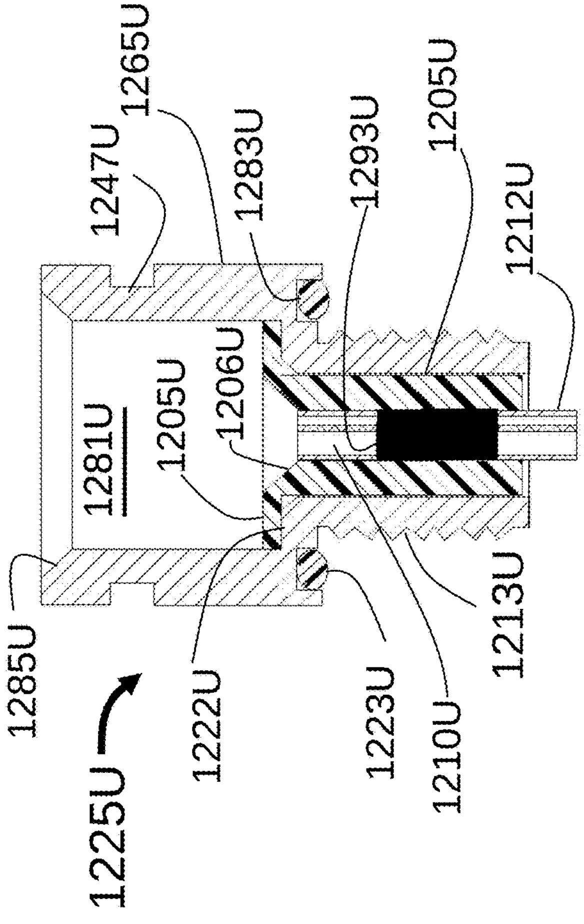
FIG. 12B is a longitudinal a cross-section view of the DMCS female USB-C bulkhead connector taken along the line 12B-12B of FIG. 12A.

FIG. 12A is the top view of a preferred embodiment of a DMCS female USB-C bulkhead connector 1225U having an internal insert 1205U with a male-female USB-C adapter 1293U having a female USB connector 1210U and a male USB connector 1212U shown in FIGS. 12B and 12C. The insert 1205U provides alignment during insertion of a male USB-C connector (not shown) into the female USB-C connector 1210U. Example of a compatible male USB-C connector include:

- A male in-line USB-C connector embodiment similar to that of the male in-line connector 130U of FIG. 3A, or
- a COTS USB-C cable, or adapter, having at least one male USB-C connector.

The female USB-C bulkhead connector 1225U has a shell 1265U with taper 1285U and bore 1281U.

FIG. 12B is a longitudinal cross-section of the DMCS female USB-C bulkhead connector 1225U taken along the line 12B-12B of FIG. 12A. The DMCS female USB-C bulkhead connector 1225U has an internal insert 1205U with proximal portion 1222U, taper 1206U and the male-female USB-C adapter 1293U with the female USB connector end 1210U (proximal/wet side) and the male connector end 1212U (distal/dry side). The taper 1206U of the insert 1205U provides alignment during insertion of a male USB-C connector (not shown) into the female USB-C connector 1210U. This is further demonstrated in FIGS. 13A-13C.

In some embodiments, the distal female USB-C connector 1212U can be used to connect to a USB-C adapter or cable (not shown) inside (the dry side) of a pressurized vessel/housing to provide power and/or data communication between equipment in the vessel and external equipment. The shell 1265U of the female bulkhead connector 1225U also includes the bore 1281U, taper 1285U, locking slot 1247U, threaded section 1213U and an O-ring 1223U in an O-ring groove 1283U.

FIG. 12C is a longitudinal cross-section of the DMCS female USB-C bulkhead connector 1225U of FIG. 12A taken along the line 12C-12C. The DMCS female USB-C bulkhead connector 1225U has an internal insert 1205U with proximal portion 1222U, taper 1206U and the male-female USB-C adapter 1293U with the female USB connector 1210U and the male connector 1212U. The taper 1206U of the insert 1205U provides alignment during insertion of a male USB-C connector (not shown) into the female USB-C connector 1210U. This is further demonstrated in FIGS. 13A-13C.

In some embodiments, the distal female or male USB-C connector 1212U can be used to connect to a USB-C adapter or cable (not shown) inside (the dry side) of a pressurized vessel/housing to provide power and/or data communication between equipment in the vessel and external equipment. The shell 1265U of the female bulkhead connector 1225U also includes the bore 1281U, taper 1285U, locking slot 1247U (not shown), threaded section 1213U, flat section 1243U, and an O-ring 1223U in an O-ring groove 1283U.

The insert 1205U shown in FIGS. 12A, 12B and 12C may be used within some embodiments of the subject bulkhead connector to ensure positioning of the COTS electrical connector within the bulkhead connector. Assembly of the insert with an integrated COTS adapter or cable varies depending on whether the objective is the sealing the wet side bulkhead connector from the dry side of the pressure vessel or not. If a splash-proof, water-resistant bulkhead connector system is desired, the insert 1205U can be molded, 3D printed or otherwise manufactured out of a squishy material that would surround the COTS electrical connector, as shown with the USB-C adapter 1293U of FIGS. 12A-12C, where in some embodiments, the insert 1205U can be glued to the USB-C adapter 1293U and the integrated insert is subsequently pressed fit or glued into the female bulkhead connector 1225U to create a water resistant seal.

The plastic insert 1205U may be shaped in various configurations depending on application and internal electrical connector. The use of an insert means a single DMCS female bulkhead connector form can be adapted to multiple internal electrical connector types.

Figure 13A:
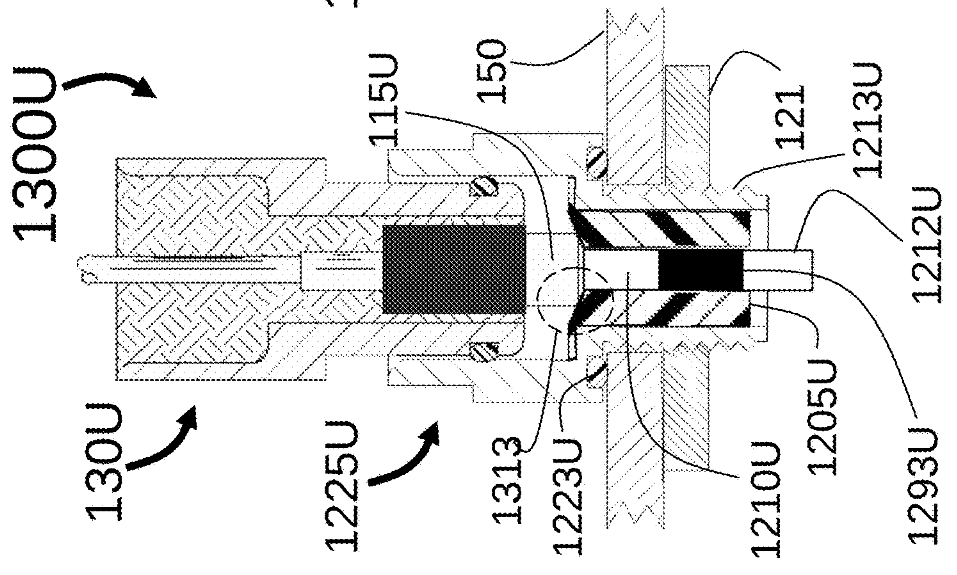
FIGS. 13A-13C are representative of misaligned and aligned mating of symmetric connectors i.e., the DMCS USB-C male in-line connector of FIG. 3A with the DMCS USB-C female bulkhead connector of FIG. 12A, where
Figure 13B:
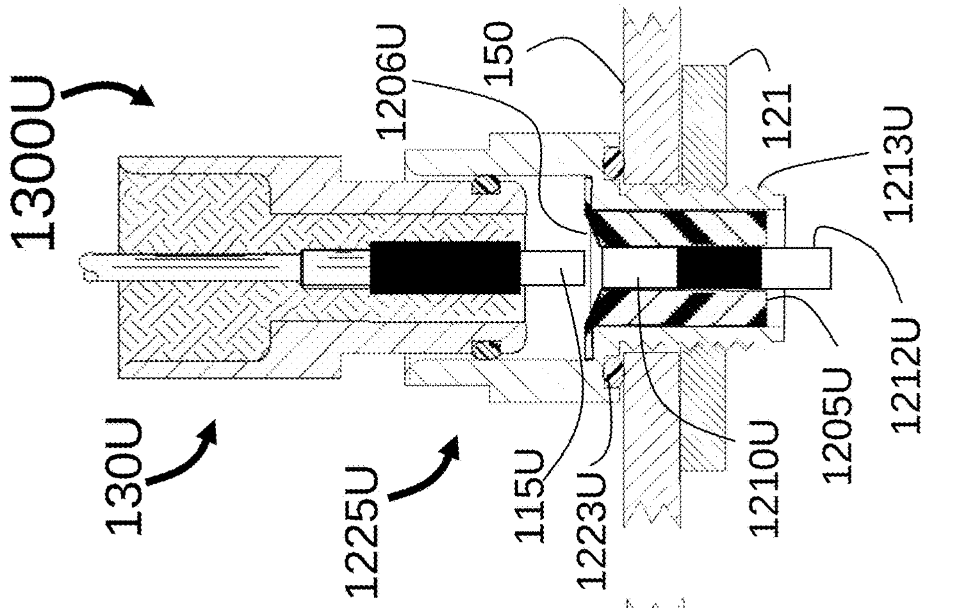
Figure 13C:
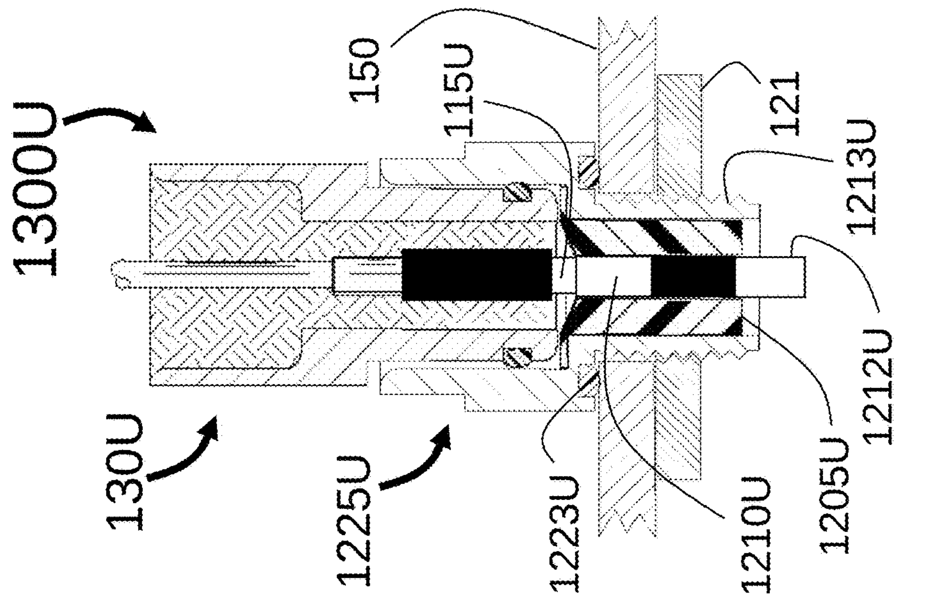

FIGS. 13A-13C are longitudinal cross-sections of a mis-aligned and aligned mating of a preferred embodiment of the subject DMCS 1300U with symmetric connectors (i.e. the DMCS USB-C male in-line connector 130U of FIG. 3A with the DMCS USB-C female bulkhead connector 1225U of FIGS. 12A, 12B and 12C). The female bulkhead connector 1225U is shown sealed against the bulkhead 150 with the nut 121 tightened over the threaded section 1213U of the female bulkhead connector 1225U to compress the O-ring 1223U against the bulkhead 150. The female bulkhead connector 1225U includes an insert 1205U with USB-C male-female connector 1293U, with the proximal female USB-C connector 1210U and the distal male USB-C connector 1212U.

FIG. 13A is a longitudinal cross-section of an embodiment of the DMCS 1300U with USB-C male in-line connector 130U and USB-C female bulkhead connector, where the connectors 130U and 1225U are misaligned in the highlighted area 1313 and cannot mate. The misalignment shows the male USB-C connector 115U of the in-line connector 130U rotated approximately 90 degrees to the female USB-C connector 1210U of the female bulkhead connector 1225U. During misalignment, the male USB-C connector 115U contacts the insert 1205U and is prevented from advancing to mate with the female USB-C connector 1210U.

FIG. 13B is a longitudinal cross-section of the DMCS 1300U connectors 130U and 1225U aligned for mating where the USB-C male in-line connector 130U is rotated 90 degrees from the male in-line connector 130U of FIG. 13A so that the male USB-C connector 115U is now aligned with the USB-C female bulkhead connector 1210U. This alignment allows the taper 1206U of the insert 1205U to guide the male USB-C connector 115U of the male in-line connector 130U into the female USB-C connector 1210U as it is advanced to mate.

FIG. 13C is a longitudinal cross-section of the DMCS 1300U where the male USB-C connector 115U of the male in-line connector 130U is fully mated with the female USB-C connector 1210U of the female bulkhead connector 1225U.

The advantage of the preferred embodiment DMCS 1300U is that any misalignment in rotation or in centering of the USB-C connector 115U results either in complete mating failure as shown in FIG. 13A (i.e. the connector will not connect) or, if the misalignment is slight, the taper 1206U will provide mechanical centering to align the male USB-C connector 115U with the female USB-C connector 1210U. This allows the user to be confident of mating when the male in-line connector 130U pushes fully into the female bulkhead connector 1225U as shown in FIG. 13C.

It is also contemplated that in some embodiments, such as the DMCS 1300U, printed or inscribed markers (such as a line) may be placed on the exterior of the male in-line connector 130U and female bulkhead connector 1225U to assist the user in properly aligning the connectors. In other embodiments, flat areas on the sides of DMCS connectors, such as the areas 143 on the in-line connector 130 and 149 of the female bulkhead connector 125 of the DMCS 100 of FIG. 2, can be used to properly align the connectors.

Figures 14A, 14B, 14C:
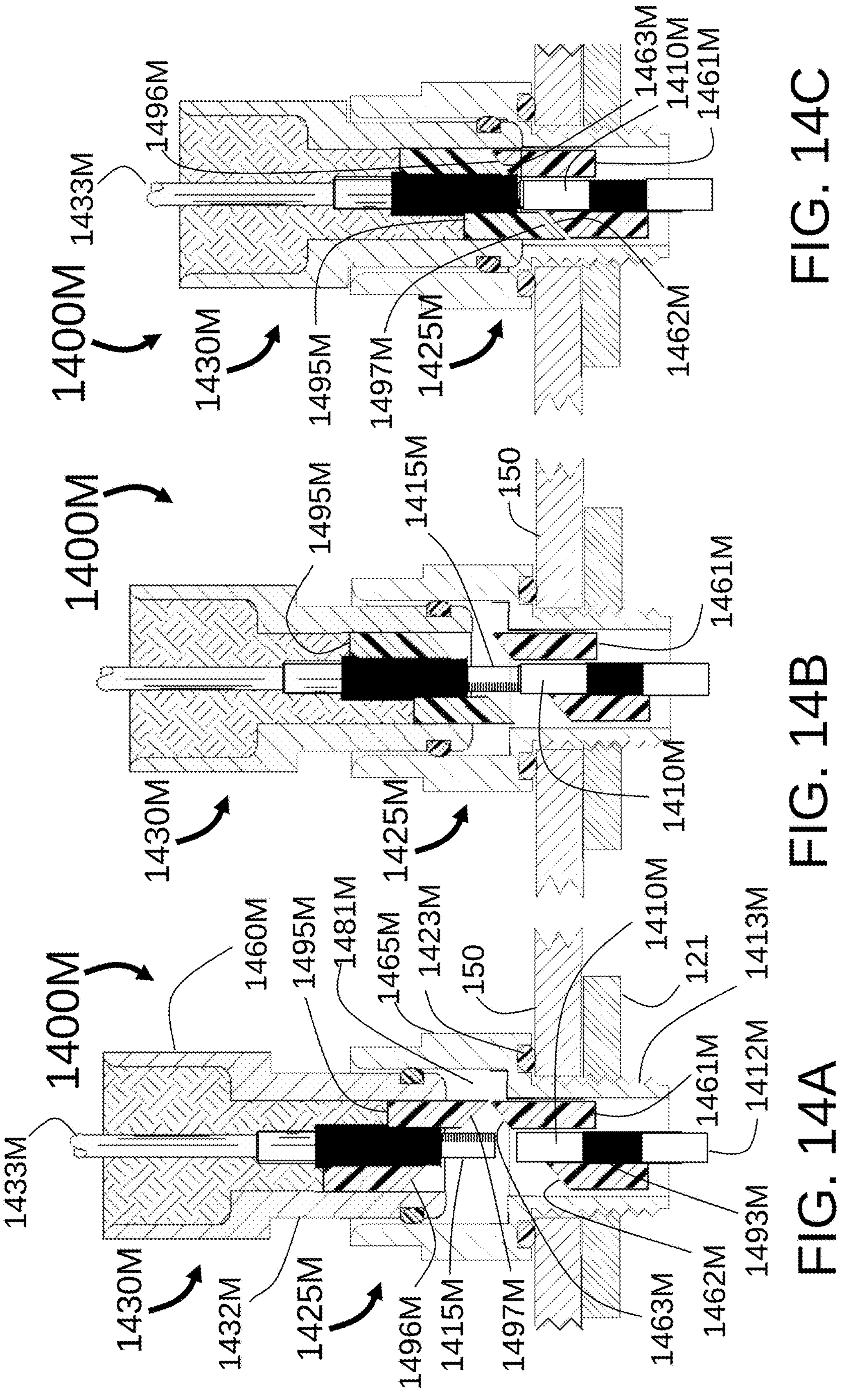
FIGS. 14A-14C are representative of misaligned and aligned mating of an embodiment of a DMCS male in-line connector with a female bulkhead connector, each with inserts designed to guide connector alignment for asymmetric COTS connectors such as ethernet, USB, micro-USB or mini USB-Connectors, where

FIGS. 14A-FIG. 14C are longitudinal cross-sections of misaligned and aligned mating of embodiment of a DMCS 1400M with male in-line connector 1430M and female bulkhead connector 1425M, each with inserts designed to guide connector alignment for asymmetric COTS connectors such as RJ-45 ethernet, USB, micro USB or mini USB-Connectors.

FIG. 14A is a longitudinal cross-section of the misaligned insertion of a DMCS 1400M male in-line connector with an USB cable 1433M with asymmetric connector 1415M (e.g., USB 1, 2, 3, RJ-45, mini USB or micro USB) into a complementary DMCS female bulkhead connector 1425M.

The shells 1465M of the female bulkhead connector 1425M and 1460M of the male in-line connector 1430M are similar to the connector shells shown in FIGS. 2 and 3A. The female bulkhead connector 1425M is shown sealed against the bulkhead 150 with the nut 121 tightened over the threaded section 1413M of the female bulkhead connector 1425M to compress the O-ring 1423M against the bulkhead 150. The female bulkhead connector 1425M has an asymmetric insert 1461M that holds the male-female asymmetric connector adapter 1493M with proximal/wet side connector 1410M and distal/dry side connector 1412M. The male in-line connector 1430M is configured with a shell 1460M, a reduced diameter section/plug 1432M and a potted asymmetric connector cable 1433M having the male asymmetric connector 1415M held in the asymmetric insert 1495M.

In FIG. 14A, the insert 1495M is shown approximately 180 degrees rotationally offset from being aligned with the insert 1461M of the female bulkhead connector 1425M. To provide 180-degree directional keying, the insert 1461M in the female bulkhead connector 1425M includes features of two different heights 1462M and 1463M and the insert 1495M in the in-line connector 1430M similarly has two different heights 1496M and 1497M. Inserts 1495M and 1461M may each be composed of one or more pieces. When alignment is 180 degrees off, as shown, 1497M interferes with 1463M, thus providing mechanical feedback (connector will not mate) without damage to electrical connectors 1415M or 1410M.

FIG. 14B is a longitudinal cross-section of the aligned insertion of a DMCS 1400M male in-line connector 1430M with the asymmetric connector 1415M into a complementary female bulkhead connector 1425M with proximal female asymmetric connector 1410M. In this configuration, the two asymmetric inserts 1495M and 1461M are now properly aligned to allow mating of the asymmetric connectors 1415M and 1410M as the male in-line connector 1430M mates with the female bulkhead connector 1425M.

FIG. 14C is a longitudinal cross-section of the fully mated DMCS 1400M of FIG. 14B. In this mated configuration, the two heights 1497M and 1496M of the insert 1495M mate respectively with the two heights 1462M and 1463M of the insert 1461M. When this occurs, the male USB connector 1415M of FIG. 14B is fully inserted into the female USB connector 1410M of the female bulkhead connector 1425M.

It is also envisioned that embodiments of the present DMCS would include guidelines marked on the outside of the male in-line connector 1430M and female bulkhead connector 1425M or flat portions, as shown in FIG. 2, to assist the proper alignment during mating.

Keying using inserts for alignment of asymmetric COTS connectors (e.g. micro-USB, ethernet) is contemplated in the present system to avoid damaging the COTS connectors during mating as any significant misalignment in rotation or in centering of the USB-C electrical connector may result either in complete mating failure (i.e. the connector will not connect) or, if the misalignment is slight, the inserts will facilitate alignment. For USB-C connectors, this method may be applied to provide backwards compatibility.

Figures 15A, 15B, 15C:
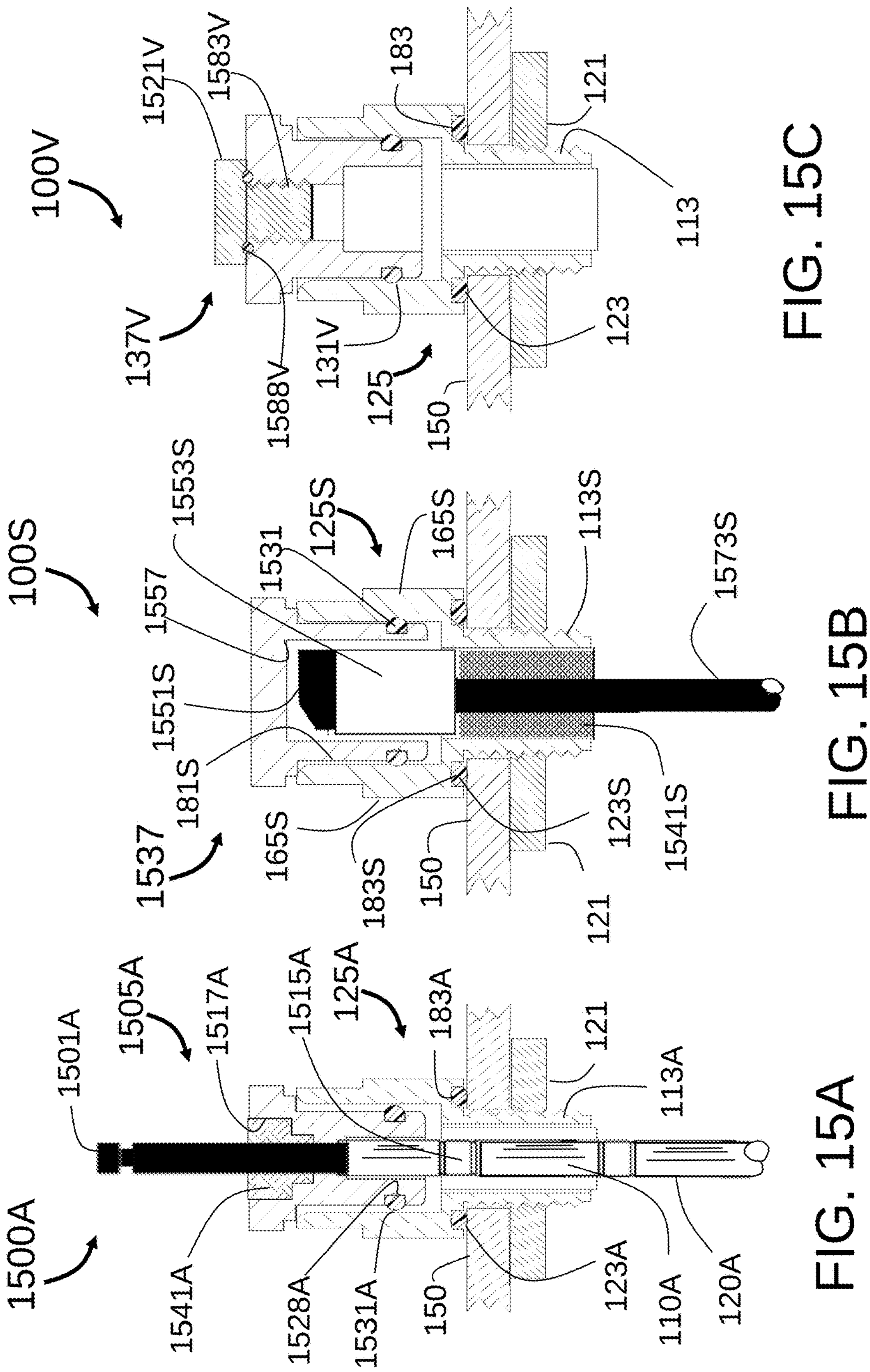
FIG. 15A shows a longitudinal cross-section of the embodiment of the DMCS configured with a functional dummy plug having an antenna mated to the DMCS female bulkhead connector of FIG. 3C.
FIG. 15B shows a longitudinal cross-section of the dummy plug of FIG. 9A mated to the embodiment of the DMCS female bulkhead connector having a MicroSD card inserted into a microSD slot in the female bulkhead connector.
FIG. 15C shows a longitudinal cross-section of the embodiment of the DMCS functional dummy plug with a vacuum port mated to the DMCS female bulkhead connector of FIGS. 4A-4B.

FIGS. 15A, 15B and 15C demonstrate views of additional dummy plug options. The basic dummy plug/cap embodiment is a simple insert as shown in FIGS. 9A-9H, however any of those embodiments may be adapted to provide embodiments with additional functionality for antennas, data storage/memory, or vacuum ports. Some embodiments of dummy plugs/caps of the present invention are adapted for ocean depth applications by the use of crush-resistant materials such as stainless steel or titanium and ensuring exact tolerance of O-ring seals. For embodiments of small diameters underwater connectors, aluminum could also be selected for deep water applications, however greater wall thicknesses would be needed compared to the use of stainless steel or titanium.

FIG. 15A is a longitudinal cross-section of an embodiment of a DMCS 1500A having a functional dummy plug 1505A with an antenna 1501A mated to the female bulkhead connector 125A of FIG. 3C. The female bulkhead connector 125A is shown sealed against the bulkhead 150 with the nut 121 tightened over the threaded section 113A of the female bulkhead connector 125A to compress the O-ring 123A in the O-ring groove 183A against the bulkhead 150.

The dummy plug 1505A includes an antenna 1501A with a slip-on female SMB connector 1515A. The antenna is potted with potting material 1541A (e.g. urethane or epoxy) into the bore/potting cup 1517A of the dummy plug 1505A. The dummy plug 1505A is shown mated via a bore seal O-ring 1531A in O-ring groove 1528A to bulkhead connector 125A containing a male-male coaxial adapter 110A. The dry-side coaxial cable 120A may be connected inside a pressure housing on the dry side of the bulkhead 150 to a GPS unit, cell modem or other device that requires an antenna 1501A.

FIG. 15B is a longitudinal cross-section of an embodiment of a DMCS 100S having a dummy plug 1537 similar to the dummy plug 137 of FIG. 9A mated to a female bulkhead connector 125S with shell 165S and bore 181S having a microSD card 1551S inserted into a microSD card slot 1553S. A cable 1573S potted with potting material 1541S into the lumen 171S of the threaded section 113S of the female bulkhead connector 125S connects the card slot 1553S to equipment on the dry side of the bulkhead 150. The female bulkhead connector 125S is shown sealed against the bulkhead 150 with the nut 121 tightened over the threaded section 1135 of the female bulkhead connector 125S to compress the O-ring 123S in O-ring groove 183S against the bulkhead 150. The dummy plug 1537 with the bore 1557 is shown inserted into the bore 181S of the female bulkhead connector 125S compressing the bore O-ring 1528 to form a bore seal between the dummy plug 1537 and the female bulkhead connector 125S. The microSD card slot is preferably located near the top or even above the bore 181S of the female bulkhead connector 125S to allow for easy removal and insertion of the microSD card 1551S.

It is also contemplated herein that a functional dummy plug with an alignment guide could house the microSD card that is inserted with the dummy plug mating into the card slot 1553S. Embodiments are envisioned of the DMCS 100S that include other forms of storage, including:

USB thumb drives,

SD cards, and

Compact flash cards.

The DMCS 100S is valuable in underwater sensing applications to aid in data offload specially in the case of very large amounts of data.

FIG. 15C is a longitudinal cross-section of an embodiment of the DMCS 100V having a functional dummy plug 137V with a threaded vacuum port 1583V sealed with vacuum sealing screw 1521V with an O-ring 1588V mated to the female bulkhead connector 125V similar to that shown in FIGS. 4A and 4B. The female bulkhead connector 125V is shown sealed against the bulkhead 150 with the nut 121 tightened over the threaded section 113V of the female bulkhead connector 125V to compress the O-ring 123V in O-ring groove 183V against the bulkhead 150.

The dummy plug 137V with a bore 1571V includes a bore O-ring 128V and is shown being mated to the bulkhead connector 125V with a bore 171V. It is envisioned that the dummy plug 137U can also be used with other embodiments of the female bulkhead connectors shown herein where application of positive pressure of vacuum is required. Not shown, but envisioned, is an adapter that can replace the screw 1521V having a valve for access to the pressure vessel and sealing before underwater use.

While embodiments of the present invention have been shown with and without an internal COTS cable and/or connector, it is envisioned that any of the features described for embodiments with COTS connectors are applicable to those embodiments without an internal COTS cable or connector. In addition, features shown for a particular COTS cable and/or connector system, e.g., USB-C are applicable to the current COTS standards described herein as well as new standards when and if they occur.

While embodiments shown typically have female COTS connectors associated with female bulkhead connectors and male COTS connectors associated with male in-line connectors, it is also envisioned that embodiments of the present invention may have male COTS connectors associated with female bulkhead connectors and female COTS connectors associated with male in-line connectors as well as female or male COTS connectors associated with male bulkhead connectors and female or male COTS connectors associated with female in-line connectors. In addition, while the embodiments addressed herein are presented as utilizing a single bore seal O-ring, it is also contemplated that two or more O-rings may be applied to the inner sealing surface of the DMCS.

It is also envisioned that locking collars such as shown in FIGS. 2 and 8A-8E would be included in any of the DMCS embodiments shown herein.

While different diameter DCMS bulkhead connector embodiments have been shown here, it is also envisioned that these could be limited to a single or a small number of different diameters that would allow for standardization of the hole sizes in the bulkheads of pressure vessels/housing for a wide range of applications. For example, in a single pressure vessel, on one mission, the DCMS USB-C system 100U shown in FIG. 3A could be used, then replaced with the DCMS ethernet system 100E of FIG. 3B for the next mission, and then on a third mission, replaced with the DCMS 100S of FIG. 15B with a dummy plug 125S sealing the micro-SD card 1551S. In each case the nut 121 is screwed of the bulkhead connector threaded section and the replacement bulkhead connector is attached to the bulkhead 150 with the same nut 121. Alternately, if the bulkhead connector is screwed into a threaded hole e.g. the hole 155 of FIG. 2, it can be unscrewed and replaced with a different version.

The term COTS cable is referred to herein as an electrical cable with at least one COTS connector. A COTS adapter means an electrical adapter that can connect one COTS connector to another including male-male, female-female and male-female where the COTS connector type need not be the same at each end.

Various other modifications, adaptations, and alternative designs are also contemplated in light of the above teachings. Therefore, it should be understood at this time that, within the scope of the appended claims, the present invention can be practiced otherwise than as specifically described herein.

What is claimed is:

1. A dry-mate connector system attachable to a wall of a sealed electronic equipment housing having an external wet side and an internal dry side for connecting the sealed electronic equipment housing to external equipment disposed at the wet side, the dry-mate connector system comprising:

a bulkhead connector having a wet part disposed at the wet side of the electronic equipment housing and a dry part, the wet part of the bulkhead connector being selected from a group consisting of a male bulkhead connector and a female bulkhead connector, the bulkhead connector including at least one seal O-ring sealing to the wall of the electronic equipment housing at the external wet side thereof, and a wet side COTS (Commercial-Of-The-Shelf) connector internally mounted inside the wet part of the bulkhead connector, wherein the dry part of the bulkhead connector comprises a dry side COTS connectivity to electronic equipment disposed within the sealed electronic equipment housing, the dry side COTS connectivity being selected from a group consisting of a dry side COTS connector and a dry side COTS cable;

an in-line connector disposed at the external wet side of the electronic equipment housing and configured for removable mating with the wet part of the bulkhead connector, the in-line connector comprising at least one O-ring seal sealing to the wet part of the bulkhead connector, and a COTS cable potted within the in-line connector and including a COTS connector adapted for mating to the wet side COTS connector in the bulkhead connector; and a dummy plug configured for removable mating with the wet part of the bulkhead connector, the dummy plug comprising at least one O-ring sealing to the wet part of the bulkhead connector.

2. The system of claim 1, wherein the wet side and dry side COTS connectors are selected from a group comprising:

a. USB Standard connectors, including USB 3, USB-C, USB-A, USB-B, Micro-USB, Mini-USB,
b. Apple standard Lightning,
c. connectors for ethernet and voice, 8P8C, RJ11, RJ14, RJ21, RJ25 and RJ-45,
d. coaxial standards RG, SMB, SMA, U.FL, MMCX, MCX, N, BNC, TNC,
e. memory card adapters for compact flash, XQD, SD, CFast, MMC and micro-SD, and combination thereof.

3. The system of claim 1, further including an antenna, the antenna being configured for mating with the female bulkhead connector or for being potted into the dummy plug.

4. The system of claim 1, wherein the COTS cable potted within the in-line connector includes a strain relief collar attached to the COTS cable.

5. The system of claim 1, wherein the bulkhead connector and the in-line connector are configured with cooperating tapered edges to facilitate in an initial phase of mating between the in-line connector and the bulkhead connector.

6. The system of claim 1, wherein the bulkhead connector and the dummy plug are configured with cooperating tapered edges to facilitate in an initial phase of mating between the dummy plug and the bulkhead connector.

7. The system of claim 1, further including a locking system adapted to maintain the mate of the in-line connector to the bulkhead connector and to prevent relative longitudinal motion of the in-line connector and the bulkhead connector.

8. The system of claim 1, wherein the bulkhead connector is a female connector configured with a bulkhead connector bore, and wherein the in-line connector is a male connector adapted to be inserted into the bulkhead connector bore of the female bulkhead connector.

9. The system of claim 1, wherein the bulkhead connector is a male connector, and wherein the in-line connector is a female connector configured with an in-line connector bore adapted to be placed over the male bulkhead connector during mating.

10. The system of claim 1, further including at least one alignment insert disposed between the in-line connector and the bulkhead connector, the at least one alignment insert being adapted to facilitate alignment during mating of the wet side COTS connectors in the in-line connector and the bulkhead connector.

11. The system of claim 10, wherein the at least one alignment insert is adapted to align symmetric wet side COTS connectors selected from the group including:

a. USB-C,
b. Lightning, or
c. coaxial.

12. The system of claim 10, wherein the at least one alignment insert is adapted to align asymmetric wet side COTS connectors selected from the group including:

a. USB-A,
b. USB-B,
c. micro-USB,
d. mini USB.

13. The system of claim 1, wherein the in-line connector further includes a shell and a potting cup configured with a bore of a diameter sufficient to create a reliable water-proof seal between the wet side COTS cable and the in-line connector shell.

14. The system of claim 13, wherein the potting cup of the in-line connector includes tapered features to improve potting adhesion to the bore of the in-line connector shell.

15. A dry-mate connector system attachable to a wall of a sealed electronic equipment housing having an external wet side and an internal dry side for connecting the sealed electronic equipment housing to external equipment disposed at the wet side, the dry-mate connector system comprising:

a female bulkhead connector having a wet part and a dry part, the female bulkhead connector including at least one O-ring sealed to a wall at the wet side of an electronic equipment housing, and a plastic insert configured with a female-to-female or male-to-female USB-C adapter adapted to provide connectivity between the wet part and the dry part of the bulkhead connector;

an in-line male connector, the in-line male connector being adapted for removable longitudinal insertion into the wet part of the bulkhead connector to assume a mated configuration, wherein the in-line male connector comprises at least one bore O-ring sealed to the wet part of the female bulkhead connector, and a potted Male-male USB-C cable, including a USB-C connector, adapted to be mated to the USB-C female adapter in the female bulkhead connector;

a locking collar configured with a substantially cylindrical shell adapted to be coaxially placed over the in-line male connector and a portion of the wet part of the bulkhead connector, wherein the locking collar assumes intermittently an unlocked configuration and a locked configuration, wherein, in the locked configuration, the locking collar is adapted to prevent separation of the mated in-line male connector and the female bulkhead connector; and a male dummy plug adapted to be removably mated to the wet part of the female bulkhead connector, the male dummy plug comprising at least one bore O-ring sealed to the wet part of the female bulkhead connector.

16. The system of claim 15, wherein the in-line male connector includes a COTS cable potted within the male in-line connector, and a strain relief collar attached to the COTS cable.

17. The system of claim 15, further including at least one alignment insert between the in-line male connector and the female bulkhead connector and adapted to facilitate alignment during mating of the USB-C connectors in the in-line male connector and the female bulkhead connector.

18. The system of claim 15, wherein the in-line male connector and female bulkhead connector are configured with cooperating tapered edges to facilitate an initial phase of mating between the in-line male connector and the female bulkhead connector.

19. The system of claim 15, wherein the male dummy plug and the female bulkhead are configured with cooperating tapered edges to facilitate an initial phase of mating between the male dummy plug and the female bulkhead connector.

20. The system of claim 15, further comprising a female in-line connector including a cable having female USB-C connector configured to be removably mated to the cable with the male USB-C connector in the in-line male connector.

21. The system of claim 15, where the in-line male connector includes an in-line male connector shell and a potting cup having a bore of a diameter sufficient to form a reliable water proof seal between the USB-C cable in the in-line male connector and the in-line male connector shell.

22. The system of claim 21, wherein the potting cup of the in-line male connector includes tapered features configured to improve potting adhesion to the bore of in-line male connector shell.

23. A method for connecting a sealed housing to at least one external electronic device for transferring data and/or power, the method comprising:

(a). sealing a dry-mate bulkhead connector to the sealed housing, the dry-mate bulkhead connector having a wet part, a dry part, and an internally mounted COTS (Commercial-Off-The-Shelf) connector;

(b). removably connecting a compatible COTS cable to the COTS connector in the dry-mate bulkhead connector, the COTS cable being adapted to provide waterproof electronic connectivity to at least one external electronic device;

(c) positioning the compatible COTS cable within a removably couplable in-line connector adapted to be co-axially sealed against a portion of the wet part of the bulkhead connector; and, (d) positioning at least one alignment insert between the in-line connector and the dry-mate bulkhead connector to provide IP68 water resistance for the in-line connector and the dry-mate bulkhead connector when unmated.

24. The method of claim 23, wherein the COTS connector in the dry-mate bulkhead connector and the compatible COTS cable are selected from a group consisting of: USB Standard connectors, including USB 3, USB-C, USB-A, USB-B, Micro-USB, Mini-USB, Apple standard Lightning, Connectors for ethernet and voice, 8P8C, RJ11, RJ14, RJ21, RJ25 and RJ-5, Coaxial standards RG, SMB, SMA, U.FL, MMCX, MCX, N, BNC, TNC, Memory card adapters for compact flash, XQD, SD, CFast, MMC, micro-SD, and combination thereof.

25. The method of claim 23, subsequent to steps (a) and (b), further including the steps of:

c. coaxially advancing a locking collar over the in-line connector; and d. engaging the locking collar with the bulkhead connector to prevent longitudinal motion of the in-line connector relative to the bulkhead connector.

26. The method of claim 23, where the compatible COTS cable is a standard COTS cable.

27. The method of claim 23, wherein the electronic equipment is selected from a group consisting of: a camera, a computer, a microprocessor, and actuator, a transducer, an environmental sensor, a visual display, a SONAR system, and combination thereof.

28. The method for claim 23, subsequent to step (a) and prior to step (b), further comprising the steps of:

i. sealing a dummy plug to the wet part of the bulkhead connector, and sealing off the COTS connector within the bulkhead connector; and ii. removing the dummy plug from the wet side of the bulkhead connector to expose the COTS connector.

29. The method of claim 28, wherein the dummy plug contains at least one device selected from a group consisting of: a data storage device, an antenna, a camera, a visual display, an acoustic transducer, an environmental sensor, a vacuum port, an actuator, a hydrophone or hydrophone array, and combination thereof.

30. The method of claim 23, attaching the in-line connector on each end of the compatible COTS cable for the connection of two sealed housing each containing electronic equipment.

31. The method of claim 30, wherein the compatible COTS cable is an oil packed cable.

32. A method for connecting a sealed housing to at least one external electronic device for transferring data and/or power, the method comprising:

(a). sealing a dry-mate bulkhead connector to the sealed housing, the dry-mate bulkhead connector having a wet part, a dry part, and an internally mounted COTS (Commercial-Off-The-Shelf) connector;

(b). removably connecting a compatible COTS cable to the COTS connector in the dry-mate bulkhead connector, the COTS cable being adapted to provide waterproof electronic connectivity to at least one external electronic device;

(c) positioning the compatible COTS cable within a removably couplable in-line connector adapted to be co-axially sealed against a portion of the wet part of the bulkhead connector; and, (d) attaching the in-line connector on each end of the compatible COTS cable for the connection of two sealed housing each containing electronic equipment.

* * * * *